United States Patent
Watanabe et al.

(10) Patent No.: US 6,757,054 B2
(45) Date of Patent: Jun. 29, 2004

(54) TIME MEASUREMENT APPARATUS, DISTANCE MEASUREMENT APPARATUS, AND CLOCK SIGNAL GENERATING APPARATUS USABLE THEREIN

(75) Inventors: Takamoto Watanabe, Nagoya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/422,764

(22) Filed: Apr. 25, 2003

(65) Prior Publication Data

US 2003/0197498 A1 Oct. 23, 2003

Related U.S. Application Data

(62) Division of application No. 10/087,758, filed on Mar. 5, 2002.

(30) Foreign Application Priority Data

Mar. 14, 2001 (JP) .......................................... 2001-72140
Mar. 14, 2001 (JP) .......................................... 2001-72141

(51) Int. Cl.[7] .......................... G01C 3/08; G01S 13/00; G01S 13/08; H03B 25/00; G03L 7/06
(52) U.S. Cl. ........................ 356/5.1; 342/70; 342/145; 331/60; 327/158
(58) Field of Search .............................. 356/5.01–5.15; 342/70, 118, 127, 145; 331/25, 60; 327/158–159, 162–163, 231, 235, 258

(56) References Cited

U.S. PATENT DOCUMENTS

| | | | |
|---|---|---|---|
| 4,559,606 A | 12/1985 | Jezo et al. | |
| 5,477,196 A | 12/1995 | Yamauchi et al. | |
| 5,789,985 A | 8/1998 | Yamauchi et al. | |
| 5,999,119 A | * 12/1999 | Carnes et al. | 342/135 |
| 6,218,982 B1 | 4/2001 | Shirai et al. | |
| 6,236,352 B1 | * 5/2001 | Walmsley | 342/118 |
| 6,393,377 B1 | * 5/2002 | Shirai et al. | 702/159 |

FOREIGN PATENT DOCUMENTS

| | | |
|---|---|---|
| JP | 60-51338 | 3/1985 |
| JP | 4-363687 | 12/1992 |
| JP | 5-312950 | 11/1993 |
| JP | 6-326574 | 11/1994 |
| JP | 7-183800 | 7/1995 |
| JP | 8-46554 | 2/1996 |
| JP | 8-265111 | 10/1996 |
| JP | 9-264949 | 10/1997 |
| JP | 2000-121726 | 4/2000 |

* cited by examiner

Primary Examiner—Thomas H. Tarcza
Assistant Examiner—Brian Andrea
(74) Attorney, Agent, or Firm—Posz & Bethards, PLC

(57) ABSTRACT

In a shift clock signal generating apparatus, a delay line includes a plurality of unit delay elements connected in cascade. A reference clock signal propagates in the delay line while being successively delayed by the unit delay elements. Switches have first ends connected with output terminals of the unit delay elements respectively, and second ends connected with a shift clock signal output path. When specified one among the switches is in its on position, a delayed clock signal which results from delaying the reference clock signal by a prescribed time interval is transmitted via the specified switch to the shift clock signal output path as a shift clock signal. The specified one among the switches is determined on the basis of data representing a phase difference of the shift clock signal from the reference clock signal. The specified switch is set in its on position.

9 Claims, 11 Drawing Sheets

TIME MEASUREMENT APPARATUS, DISTANCE MEASUREMENT APPARATUS, AND CLOCK SIGNAL GENERATING APPARATUS USABLE THEREIN

The present application is a division of application Ser. No. 10/087,758, filed on Mar. 5, 2002, entitled TIME MEASUREMENT APPARATUS, DISTANCE MEASUREMENT APPARATUS. AND CLOCK SIGNAL GENERATING APPARATUS USABLE THEREIN, which is based unon and claims the benefit of Japanese Parent Applications Nos. 2001-72140 and 2001-72 140 filed on Mar. 14. 2001, the contents of which are incorporated herein by reference.

BACKGROUND OF THE INVENTION

1. Field of the Invention

This invention relates to a time measurement apparatus. In addition, this invention relates to a distance measurement apparatus. Furthermore, this invention relates to an apparatus for generating a clock signal or a set of different-phase clock signals (multi-phase clock signals) which can be used in, for example, a time measurement apparatus or a distance measurement apparatus.

2. Description of the Related Art

A prior-art distance measurement apparatus of a spread spectrum type which is mounted on an automotive vehicle measures the distance between the present vehicle and a preceding target object such as a preceding vehicle by using an electromagnetic wave modulated in accordance with a pseudo random noise code (for example, a maximum length code). Specifically, a beam of an electromagnetic wave whose amplitude is modulated in accordance with a pseudo random noise code of a predetermined bit length is emitted in a forward direction with respect to the body of the present vehicle. A moment of the transmission of the pseudo random noise code with the electromagnetic wave is memorized. The prior-art apparatus receives an echo beam caused by reflection of the forward electromagnetic-wave beam at a preceding target object. The received echo beam is converted into a binary echo electric signal. Calculation is made about the value of the correlation between the binary echo electric signal and the pseudo random noise code used for the modulation of the transmitted electromagnetic wave. A moment at which the calculated correlation value peaks is detected as a moment of the reception of the pseudo random noise code contained in the echo beam. The prior-art apparatus calculates the distance between the present vehicle and the preceding target object from the time interval between the moment of the transmission of the pseudo random noise code and the moment of the reception thereof, and also from the velocity of the electromagnetic wave.

In the prior-art apparatus, the pseudo random noise code has a sequence of bits, the number of which is predetermined. The correlation-value calculation is iterated at a period corresponding to one bit of the pseudo random noise code. Accordingly, the time interval between the moment of the transmission of the pseudo random noise code and the moment of the reception thereof is determined at a resolution corresponding to a 1-bit time interval (a 1-chip time interval). A resolution of the measured distance between the present vehicle and the preceding target depends on the resolution of the determination of the time interval. In the case where a clock frequency, the reciprocal of which corresponds to a 1-bit time interval, is equal to 20 MHz, the resolution of the measured distance between the present vehicle and the preceding target is equal to 7.5 m.

U.S. Pat. No. 6,218,982 B1 corresponding to Japanese patent application publication number 2000-121726 discloses a distance measurement apparatus in which a pseudo random noise code is generated synchronously with a reference clock signal. A first forward electromagnetic wave is transmitted in response to the pseudo random noise code. A first echo wave is received which is caused by reflection of the first forward electromagnetic wave at an object. The received first echo wave is converted into a binary signal. A value of a correlation between the binary signal and the pseudo random noise code is repetitively calculated at a predetermined period having a synchronous relation with the reference clock signal. A time interval taken by the first forward electromagnetic wave and the first echo wave to travel to and from the object is measured in response to a timing at which the calculated correlation value peaks. Then, a second forward electromagnetic wave is transmitted in response to a transmitted pulse signal. A second echo wave related to the second forward electromagnetic wave is received. The received second echo wave is converted into a received pulse signal. A delay circuit defers the transmitted pulse signal by a delay time corresponding to the measured time interval to generate a delayed transmitted pulse signal. A phase difference between the received pulse signal and the delayed transmitted pulse signal is measured at a resolution higher than a resolution corresponding to the predetermined period of the correlation-value calculation. A distance to the object is calculated on the basis of the measured time interval and the measured phase difference.

U.S. Pat. No. 5,477,196 corresponding to Japanese patent application publication number 7-183800 discloses a pulse signal device for encoding a pulse phase difference or controlling an oscillation frequency based on delayed signals sequentially outputted by a delay circuit. The encoding of a pulse phase difference or the oscillation frequency control can be simultaneously performed by using a single delay device. There is provided a frequency converter including a ring oscillator consisting of inverting circuits interconnected in the form of a ring, a pulse phase difference encoding circuit for encoding the cycle of a reference signal into a binary digital value based on a pulse outputted by the ring oscillator, an arithmetic circuit for multiplying or dividing the binary digital value by a predetermined value to generate control data, and a digitally controlled oscillation circuit for generating a pulse signal in a cycle in accordance with the control data. The ring oscillator is shared by the encoding circuit and the oscillation circuit. This makes constant the time resolutions of the encoding circuit and the oscillation circuit, thereby allowing accurate frequency conversion.

U.S. Pat. No. 4,559,606 corresponding to Japanese patent application publication number 60-51338 discloses an arrangement to provide an accurate time-of-arrival indication for a received signal. The arrangement comprises a plurality of correlation means coupled to the received signal. The received signal is clocked into each of the plurality of correlation means by a different one of a plurality of different phased clocks. The different phased clocks occur at a predetermined different time uniformly spaced over a given time interval. The arrangement further comprises integration means coupled to each of the plurality of correlation means to provide the indication of the time of arrival of the received signals. The plurality of correlation means includes a plurality of received-signal shift registers into which the received signals are shifted by a different one of the plurality of phased clocks, a common reference signal shift register and a plurality of comparison means each coupled to each stage of a different one of the plurality of received-signal shift registers and each stage of the common reference signal shift register to compare the contents of the associated stages of the plurality of received-signal shift registers and the common reference signal shift register and to produce an output signal indicative of the results of each of the comparisons.

Japanese patent application publication number 4-363687 discloses a distance measurement system having a transmitter side and a receiver side. In the transmitter side, a carrier signal outputted from a carrier oscillator is spread-spectrum-modulated in accordance with a PN (pseudo noise) code fed from a PN code generator. The transmitter side transmits the modulation-resultant spread spectrum signal as a forward radio wave. An echo radio wave caused by reflection of the forward radio wave at an object is received by the receiver side, being converted into a received spread spectrum signal thereby. The receiver side includes a variable delay circuit which variably shifts the phase of the PN code used in the transmitter side to get a phase-shifted PN code. The receiver side detects a correlation between the phase-shifted PN code and the received spread spectrum signal. The receiver side determines the quantity of the PN-code phase shift at which the detected correlation peaks. The distance to the object is calculated on the basis of the determined quantity of the PN-code phase shift.

Japanese patent application publication number 9-264949 discloses a random modulation radar apparatus including a transmitter for transmitting a forward electromagnetic wave of a random pulse form given by a maximum length code. The apparatus receives an echo electromagnetic wave caused by reflection of the forward electromagnetic wave at an object. The distance to the object is measured according to the propagation delay time from the moment of the transmission of the forward electromagnetic wave to the moment of the arrival of the echo electromagnetic wave. The phase of the maximum length code is shifted stepwise to get a phase-shifted code. The apparatus calculates the correlation between the phase-shifted code and a received signal which may indicate an echo electromagnetic wave. The apparatus detects a peak of the correlation, and decides the moment of the arrival of the echo electromagnetic wave according to the detection of the correlation peak. The apparatus includes a judgment device for determining whether the wave-transmitting action of the transmitter should be continued or terminated on the basis of the detected peak of the correlation. When a high S/N ratio is attained regarding the detection of the distance to an object, the wave-transmitting action of the transmitter in one distance measurement process is terminated in response to the result of the determination by the judgment device. The high S/N ratio occurs in the case where the distance to the object is relatively short.

Japanese patent application publication number 5-312950 discloses a distance measurement apparatus which includes a maximum length code generator. A laser diode generates laser light modulated in accordance with a maximum length code produced by the maximum length code generator. A beam of the laser light is emitted toward an object. The apparatus includes a phase shifter which shifts the maximum length code by different values within a time interval corresponding to one bit of the maximum length code. The phase shifter outputs a plurality of shifted maximum length codes. The apparatus includes a photodiode which receives an echo beam caused by the reflection of the forward laser beam at the object. The photodiode converts the received echo beam into a corresponding echo electric signal. The values of the correlations between the echo electric signal and the shifted maximum length codes are calculated. Two straight lines are determined on the basis of the calculated correlation values. A point of intersection between the two straight lines is calculated. The distance to the object is computed on the basis of the calculated intersection point. The measurement gain is adjusted in response to the strength of the echo electric signal.

Japanese patent application publication number 6-326574 discloses a delay control device which includes a delay circuit, a phase difference detection circuit, and a phase difference voltage conversion circuit. The phase difference detection circuit detects the phase difference between a signal inputted into the delay circuit and a signal outputted therefrom. The phase difference voltage conversion circuit is informed of the detected phase difference. The phase difference voltage conversion circuit generates a voltage depending on the detected phase difference. The generated voltage is applied to the delay circuit as a delay control voltage. The signal delay provided by the delay circuit is controlled in response to the delay control signal.

Japanese patent application publication number 8-46554 discloses a delay equalization circuit including an analog-to-digital converter which changes an analog signal into a corresponding digital signal. A shift register having taps delays the digital signal by different delay times to generate different delay-resultant signals. The delay-resultant signals are applied to input terminals of a matrix switch, respectively. The matrix switch has output terminals which can be connected with the input terminals thereof. The matrix switch can change connection between the input terminals and the output terminals. Delay-resultant signals which appear at the output terminals of the matrix switch are applied to fast Fourier transform devices, respectively. Each of the fast Fourier transform devices extracts "n" components of the associated delay-resultant signal which have "n" specified frequencies respectively. The "n" frequency components are applied to an inverse Fourier transform device. The inverse Fourier transform device subjects the applied frequency components to inverse Fourier transform to generate time-domain digital data. A digital-to-analog converter changes the digital data into a corresponding analog signal.

U.S. Pat. No. 5,789,985 corresponding to Japanese patent application publication number 8-265111 discloses a frequency multiplying device which multiplies the frequency of an externally-supplied reference signal PREF. The frequency multiplying device includes a digitally controlled oscillation circuit, a counter/data-latch circuit, and a control circuit. The digitally controlled oscillation circuit includes a ring oscillator formed of thirty-two inverting circuits in a ring configuration which are adapted to generate sixteen clock signals having a period that is thirty-two times the inversion time of each inverting circuit and a phase interval that is twice the inverting circuit inversion time, and produces an output signal POUT having a period that corresponds to frequency control data CD at a resolution of the phase difference time of the clock signals. The counter/data-latch circuit counts the clock signal RCK released by the ring oscillator within one period of the reference signal PREF and delivers the frequency control data CD of the count value to the digitally controlled oscillation circuit. The control circuit controls the operation of the digitally controlled oscillation circuit and the counter/data-latch circuit so that the oscillation output signal POUT having the frequency of the reference signal PREF multiplied by sixteenth (32/2) is generated by the digitally controlled oscillation circuit.

SUMMARY OF THE INVENTION

It is a first object of this invention to provide a time measurement apparatus having a high resolution.

It is a second object of this invention to provide a distance measurement apparatus having a high resolution.

It is a third object of this invention to provide an improved apparatus for generating a clock signal or a set of different-phase clock signals (multi-phase clock signals).

A first aspect of this invention provides a shift clock signal generating apparatus for generating a shift clock signal having a prescribed phase difference from a reference clock signal. The apparatus comprises a delay line receiving the reference clock signal and including a plurality of unit delay elements connected in cascade, wherein each of the unit delay elements provides a prescribed signal delay time, and the reference clock signal propagates in the delay line while being successively delayed by the unit delay elements; a shift clock signal output path; a group of switches having first ends connected with output terminals of the unit delay elements respectively, and second ends connected with the shift clock signal output path, wherein when specified one among the switches is in its on position, a delayed clock signal which results from delaying the reference clock signal by a prescribed time interval is transmitted via the specified switch to the shift clock signal output path as the shift clock signal; and switch controlling means for determining the specified one among the switches on the basis of data representing a phase difference of the shift clock signal from the reference clock signal, and for setting the specified switch in its on position.

A second aspect of this invention is based on the first aspect thereof, and provides a shift clock signal generating apparatus comprising a plurality of delay lines each being equal in structure to the previously-mentioned delay line, a plurality of groups of switches each being equal in structure to the previously-mentioned group of switches, a plurality of shift clock signal output paths each being equal in structure to the previously-mentioned shift clock signal output path, and a plurality of switch controlling means each being equal in structure to the previously-mentioned switch controlling means to generate shift clock signals having prescribed phase differences from the reference clock signal, the prescribed phase differences being different from each other, wherein a number of the delay lines, a number of the groups of switches, a number of the shift clock signal output paths, and a number of the switch controlling means correspond to a number of the shift clock signals.

A third aspect of this invention is based on the first aspect thereof, and provides a shift clock signal generating apparatus comprising a plurality of groups of switches each being equal in structure to the previously-mentioned group of switches, a plurality of shift clock signal output paths each being equal in structure to the previously-mentioned shift clock signal output path, and a plurality of switch controlling means each being equal in structure to the previously-mentioned switch controlling means to generate shift clock signals having prescribed phase differences from the reference clock signal, the prescribed phase differences being different from each other, wherein first ends of the switches in each of the groups are connected with the output terminals of the unit delay elements respectively, and wherein a number of the groups of switches, a number of the shift clock signal output paths, and a number of the switch controlling means correspond to a number of the shift clock signals.

A fourth aspect of this invention is based on the third aspect thereof, and provides a shift clock signal generating apparatus wherein the switch groups are connected with the output terminals of ones among the unit delay elements in correspondence with the prescribed phase differences of the related shift clock signals from the reference clock signal.

A fifth aspect of this invention is based on the fourth aspect thereof, and provides a shift clock signal generating apparatus wherein the unit delay elements are separated into groups having a number equal to a number of the shift clock signals, and the switch groups are connected with unit delay elements in the corresponding unit-delay-element groups respectively.

A sixth aspect of this invention is based on the first aspect thereof, and provides a shift clock signal generating apparatus further comprising a reference clock signal output path for outputting the reference clock signal to an external as it is.

A seventh aspect of this invention is based on the first aspect thereof, and provides a shift clock signal generating apparatus wherein each of the unit delay elements includes a gate circuit for providing the prescribed signal delay time.

An eighth aspect of this invention is based on the first aspect thereof, and provides a shift clock signal generating apparatus wherein the switch controlling means operates for determining the specified one among the switches on the basis of period data and ratio data, the period data representing a numeric value of a period of the reference clock signal while a time resolution is given by the prescribed signal delay time provided by each of the unit delay elements, the ratio data representing a ratio between a delay time of the shift clock signal relative to the reference clock signal and the period of the reference clock signal.

A ninth aspect of this invention is based on the eighth aspect thereof, and provides a shift clock signal generating apparatus wherein the ratio represented by the ratio data is equal to $y/(x+1)$, and "x" denotes a predetermined natural number and "y" denotes a natural number in a range of "1" to "x".

A tenth aspect of this invention is based on the ninth aspect thereof, and provides a shift clock signal generating apparatus further comprising a ring delay line including a plurality of unit delay elements connected in a closed loop and being equal in characteristics to the unit delay elements in the previously-mentioned delay line, wherein a pulse signal circulates through the ring delay line while being delayed by the unit delay elements; and time A/D converting means for counting a number of times the pulse signal goes round the ring delay line, for generating the period data in response to the counted number of times, and for feeding the period data to the switch controlling means.

An eleventh aspect of this invention is based on the eighth aspect thereof, and provides a shift clock signal generating apparatus further comprising a digitally controlled oscillation circuit for outputting a signal having a period controllable while a time resolution is given by the prescribed signal delay time provided by each of the unit delay elements, the digitally controlled oscillation circuit using control data in controlling the period of the signal outputted therefrom, the delay line receiving the signal outputted from the digitally controlled oscillation circuit as the reference clock signal, the switch controlling means operating for using the control data as the period data.

A twelfth aspect of this invention is based on the eighth aspect thereof, and provides a shift clock signal generating apparatus further comprising a digitally controlled oscillation circuit for outputting a signal having a period controllable while a time resolution is given by the prescribed signal delay time provided by each of the unit delay elements, the digitally controlled oscillation circuit using control data in controlling the period of the signal outputted therefrom, and a frequency divider circuit for dividing a frequency of the signal outputted from the digitally controlled oscillation circuit to generate the reference clock signal having a duty cycle of 50%, the delay line receiving the reference clock signal generated by the frequency divider circuit, the switch controlling means operating for doubling a period represented by the control data to calculate the period of the reference clock signal and for generating the period data in accordance with the calculated period.

A thirteenth aspect of this invention is based on the eleventh aspect thereof, and provides a shift clock signal generating apparatus wherein the digitally controlled oscillation circuit includes a ring delay line including a plurality of unit delay elements connected in a closed loop and being equal in characteristics to the unit delay elements in the previously-mentioned delay line, wherein a pulse signal circulates through the ring delay line while being delayed by the unit delay elements; time A/D converting means for counting a number of times the pulse signal goes round the ring delay line, for generating the period data in response to the counted number of times, and for outputting the period data; dividing means for dividing a value of the period data outputted from the time A/D converting means by a preset number to generate the control data; and signal outputting means for comparing a value of the control data and a number of times the pulse signal passes through a unit delay element in the ring delay line, and for outputting a prescribed-pulsewidth signal each time the value of the control data and the number of times become equal to each other.

A fourteenth aspect of this invention provides a time measurement apparatus comprising a shift clock signal generating means for generating a plurality of shift clock signals in response to a reference clock signal, the shift clock signals having a period equal to a period of the reference clock signal, the shift clock signals having phases different from each other; signal inputting means for converting an input signal into binary signals in response to the shift clock signals generated by the shift clock signal generating means respectively, the input signal containing a pulse train of a pseudo random noise code; correlation calculating means for calculating correlations between the pseudo random noise code and the binary signals generated by the signal inputting means; detecting means for detecting a moment at which a peak of the correlations calculated by the correlation calculating means occurs; and measuring a time interval from a prescribed moment to a moment of occurrence of the pulse train in the input signal on the basis of the moment detected by the detecting means.

A fifteenth aspect of this invention is based on the fourteenth aspect thereof, and provides a time measurement apparatus wherein a number of the shift clock signals is equal to a predetermined integer "n", and differences between the phases of the shift clock signals are equal to the reference-clock-signal period divided by the predetermined integer "n".

A sixteenth aspect of this invention is based on the fourteenth aspect thereof, and provides a time measurement apparatus wherein the correlations calculated by the correlation calculating means are in pairs each having correlations related to two among the shift clock signals which have phases most different from each other, and further comprising averaging means for averaging correlations in each of the pairs into a mean correlation, the detecting means operating for detecting a moment at which a peak of the mean correlations generated by the averaging means occurs as an indication of the moment of occurrence of the pulse train in the input signal.

A seventeenth aspect of this invention is based on the fourteenth aspect thereof, and provides a time measurement apparatus wherein the correlation calculating means includes synchronizing means for sampling the binary signals generated by the signal inputting means into second binary signals in response to the reference clock signal, and means for calculating correlations between the pseudo random noise code and the second binary signals, the correlation calculating means and the detecting means operating in response to the reference clock signal.

An eighteenth aspect of this invention is based on the seventeenth aspect thereof, and provides a time measurement apparatus wherein the detecting means operates for detecting a moment at which a peak of the correlations calculated by the correlation calculating means occurs on the basis of one of (1) a moment at which one of the correlations exceeds a preset threshold value and (2) a phase difference between the reference clock signal and one among the shift clock signals which corresponds to the correlation exceeding the preset threshold value.

A nineteenth aspect of this invention is based on the eighteenth aspect thereof, and provides a time measurement apparatus wherein the detecting means operates for detecting a moment at which a peak of the correlations calculated by the correlation calculating means occurs on the basis of a moment at which one of the correlations first exceeds a preset threshold value.

A twentieth aspect of this invention provides a spread-spectrum distance measurement apparatus comprising pulse train generating means for generating a pulse train of a pseudo random noise code in synchronism with a reference clock signal, the pseudo random noise code having a prescribed bit length; transmitting means for transmitting an electromagnetic wave modulated in accordance with the pulse train generated by the pulse train generating means; receiving means for receiving an echo wave caused by reflection of the electromagnetic wave transmitted by the transmitting means at an object to be measured, and for converting the received echo wave into a received pulse train signal; time measuring means for measuring a time interval from a moment of transmission of the electromagnetic wave from the transmitting means to a moment of reception of the echo wave by the receiving means on the basis of the pseudo random noise code and the received pulse train signal; and distance calculating means for calculating a distance to the object on the basis of the time interval measured by the time measuring means. The time measuring means comprises the time measurement apparatus of the fourteenth aspect of this invention.

A twenty-first aspect of this invention is based on the twentieth aspect thereof, and provides a spread-spectrum distance measurement apparatus wherein the pulse train generating means operates for generating the pulse train of the pseudo random noise code a plurality of times, and the time measuring means operates for measuring the time interval a plurality of times, and the distance calculating means operates for averaging the time intervals measured by the time measuring means into a mean time interval, and for calculating the distance to the object on the basis of the mean time interval.

A twenty-second aspect of this invention is based on the twenty-first aspect thereof, and provides a spread-spectrum distance measurement apparatus wherein the time measuring means operates for determining a center among the time intervals measured by the time measuring means, for excluding one or more among the time intervals which deviate from the center by greater than a prescribed value to get remaining time intervals, and for averaging the remaining time intervals into the mean time interval.

DESCRIPTION OF THE PREFERRED EMBODIMENTS

First Embodiment

Figure 1:
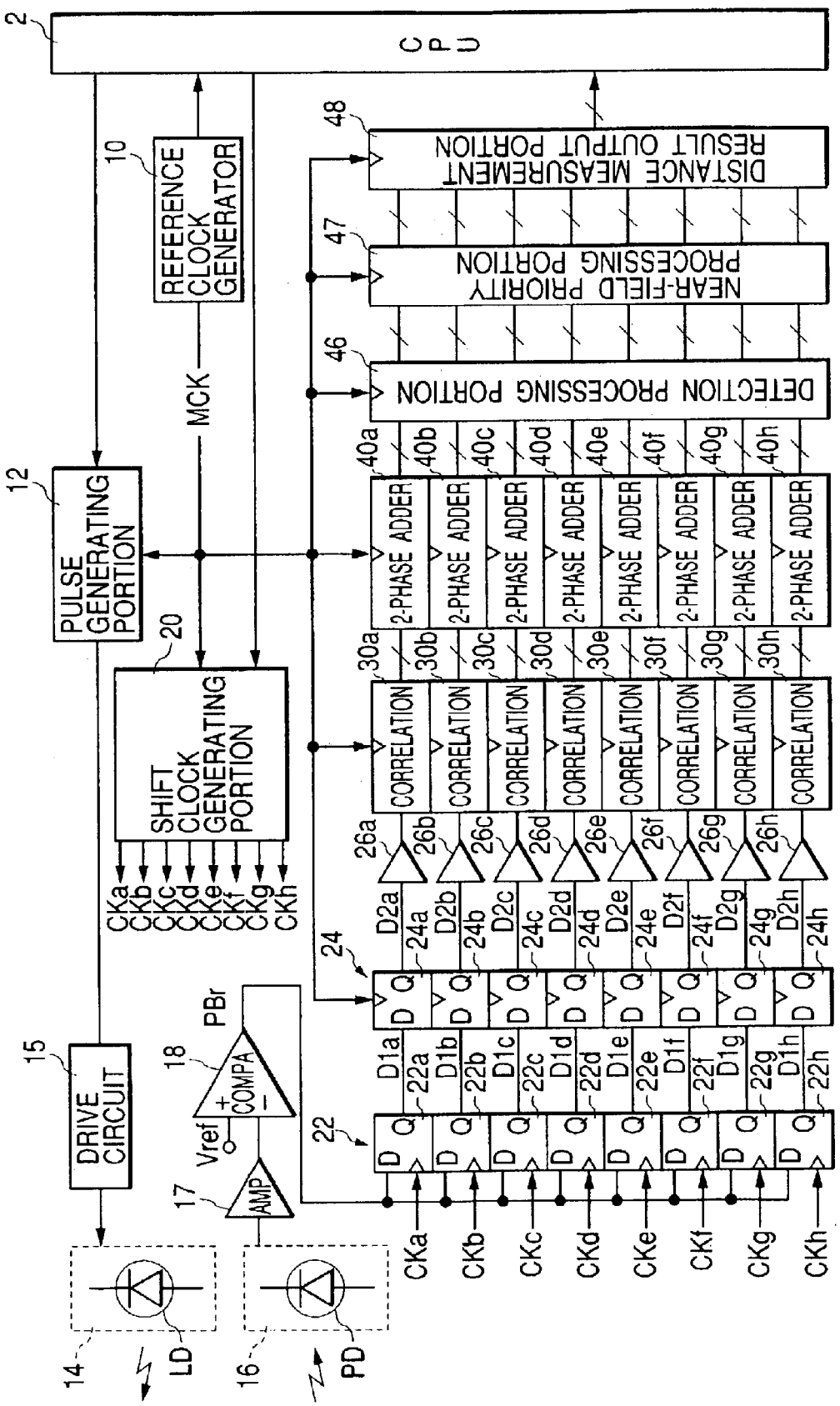
FIG. 1 is a block diagram of a distance measurement apparatus according to a first embodiment of this invention.

FIG. 1 shows a distance measurement apparatus according to a first embodiment of this invention. The apparatus of FIG. 1 uses a spread spectrum technique. For example, the apparatus of FIG. 1 is mounted on an automotive vehicle, and operates to measure a distance between the present vehicle and a preceding target object such as a preceding vehicle.

The apparatus of FIG. 1 includes a reference clock signal generator 10, a pulse generating portion 12, a light emitting portion 14, and a drive circuit 15. The reference clock signal generator 10 produces a reference clock signal MCK having a predetermined frequency, for example, 20 MHz. The pulse generating portion 12 receives the reference clock signal MCK from the reference clock signal generator 10. The pulse generating portion 12 produces a pulse train of a pseudo random noise code (a PN code) in synchronism with the reference clock signal MCK. The PN code has a predetermined bit length. The PN code is, for example, a maximum length code having a 31-bit length. The pulse generating portion 12 outputs the PN-code pulse train to the drive circuit 15. The PN-code pulse train produced by the pulse generating portion 12 is also referred to as the light emission pulse train. The drive circuit 15 controls the light emitting portion 14 in response to the PN-code pulse train so that the light emitting portion 14 generates a beam of an electromagnetic wave subjected to amplitude modulation responsive to the PN-code pulse train. The light emitting portion 14 transmits the beam of the electromagnetic wave in a forward direction with respect to the body of the present vehicle. The amplitude modulation is, for example, intensity modulation. The beam of the electromagnetic wave is, for example, a beam of laser light.

The light emitting portion 14 includes a laser diode LD which operates to emit a laser beam in the forward direction with respect to the body of the present vehicle. The drive circuit 15 activates and deactivates the laser diode LD, that is, allows and inhibits the emission of the forward laser beam in response to the PN-code pulse train. Specifically, the drive circuit 15 activates the laser diode LD and hence allows the emission of the forward laser beam when the PN-code pulse train is in its high-level state. The drive circuit 15 deactivates the laser diode LD and hence inhibits the emission of the forward laser beam when the PN-code pulse train is in its low-level state. Accordingly, the forward laser beam emitted from the laser diode LD reflects the PN-code pulse train.

A microcomputer or a CPU 2 receives the reference clock signal MCK from the reference clock signal generator 10. The CPU outputs a signal of the PN code to the pulse generating portion 12 in synchronism with the reference clock signal MCK. The pulse generating portion 12 produces the PN-code pulse train in response to the PN-code signal outputted from the CPU 2.

The apparatus of FIG. 1 also includes a light receiving portion 16, an amplifier 17, and a comparator 18. The forward laser beam outputted from the light emitting portion 14 is reflected by a preceding target object such as a preceding vehicle. The reflection of the forward laser beam at the preceding target object causes an echo beam which returns toward the apparatus. The light receiving portion 16 receives an echo beam, and converts the received echo beam into a received signal (a received electric signal). The light receiving portion 16 feeds the received signal to the amplifier 17. The device 17 amplifies the received signal. The amplifier 17 outputs the amplification-resultant signal to the comparator 18. The comparator 18 receives a predetermined reference voltage Vref The device 18 compares the output signal of the amplifier 17 with the reference voltage Vref, thereby converting the output signal of the amplifier 17 into a binary signal (a light reception pulse train) PBr. Specifically, the comparator 18 outputs a high level when the voltage of the output signal of the amplifier 17 exceeds the reference voltage Vref. The comparator 18 outputs a low level when the voltage of the output signal of the amplifier 17 is equal to or lower than the reference voltage Vref. The comparator 18 outputs the binary signal PBr to a latch portion 22.

The light receiving portion 16 includes a current sensing resistor (not shown) and a photodiode PD. The photodiode PD is connected via the current sensing resistor to a power feed line in a reverse bias state. When an echo beam is incident to the photodiode PD, a photo-caused current flows therethrough. The current sensing resistor converts the photo-caused current into a voltage signal which is outputted to the amplifier 17 as a received signal.

The pulse generating portion 12 corresponds to a pulse train generating means. The light emitting portion 14 and the drive circuit 15 compose a transmitting means. The light receiving portion 16, the amplifier 17, and the comparator 18 compose a receiving means.

Figure 2:
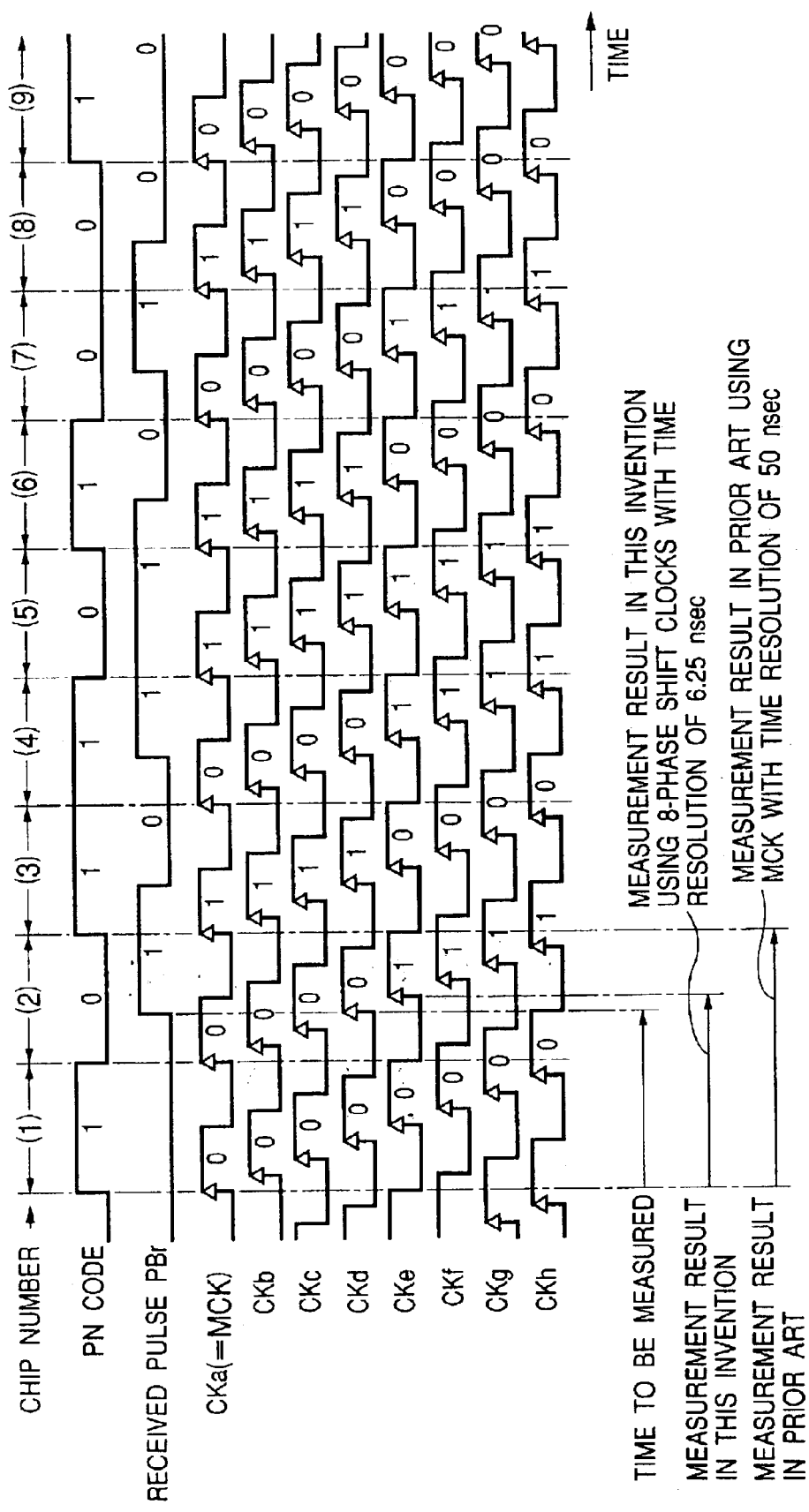
FIG. 2 is a time-domain diagram of signals occurring in the apparatus of FIG. 1.

The apparatus of FIG. 1 further includes a shift clock signal generating portion 20 which receives the reference clock signal MCK from the reference clock signal generator 10. The shift clock signal generating portion 20 produces 8 different-phase clock signals (8 multi-phase clock signals or 8-phase clock signals) CKa, CKb, . . . , and CKh in synchronism with the reference clock signal MCK. The 8 clock signals CKa, CKb, . . . , and CKh have phases different from each other. As shown in FIG. 2, the phase differences between the neighboring clock signals CKa, CKb, . . . , and CKh are equal to one eighth of the period of the reference clock signal MCK. Specifically, the clock signal CKa is equal in phase to the reference clock signal MCK. The clock signal CKb has a phase delay of 45 degrees from the reference clock signal MCK. The clock signal CKc has a phase delay of 90 degrees from the reference clock signal MCK. The clock signal CKd has a phase delay of 135 degrees from the reference clock signal MCK. The clock signal CKe has a phase delay of 180 degrees from the reference clock signal MCK. The clock signal CKf has a phase delay of 225 degrees from the reference clock signal MCK. The clock signal CKg has a phase delay of 270 degrees from the reference clock signal MCK. The clock signal CKh has a phase delay of 315 degrees from the reference clock signal MCK.

In a prior-art distance measurement apparatus using a spread spectrum technique, a light emission pulse train of a PN code is generated synchronously with a reference clock signal, and a light reception signal is sampled in response to the reference clock signal to generate a data signal having a bit length equal to that of the PN code. The correlation between the data signal and the PN code is calculated. A moment at which the calculated correlation peaks is detected. The detected moment is used as an indication of the moment of the arrival of an echo beam caused by reflection of a transmitted forward laser beam at a preceding target object, that is, the moment of the arrival of an echo beam corresponding to a transmitted forward laser beam. The time interval between the moment of the transmission of the forward laser beam and the moment of the arrival of the corresponding echo beam is measured. Thus, in the prior-art distance measurement apparatus, the resolution of the time interval measurement is equal to one period of the reference clock signal. Accordingly, the measured time interval has an error up to one period of the reference clock signal (see FIG. 2). In the case where the reference clock signal has a frequency of 20 MHz, the measured time interval takes one among 50 nsec, 100 nsec, 150 nsec, . . . . In this case, the resolution of the time interval measurement is equal to 50 nsec.

On the other hand, in the apparatus of FIG. 1, the resolution of time interval measurement is equal to one eighth of the period of the reference clock signal MCK, that is, 6.25 nsec which is determined by the phase differences (45 degrees) between the neighboring clock signals CKa, CKb, . . . , and CKh (see FIG. 2).

Figure 3:
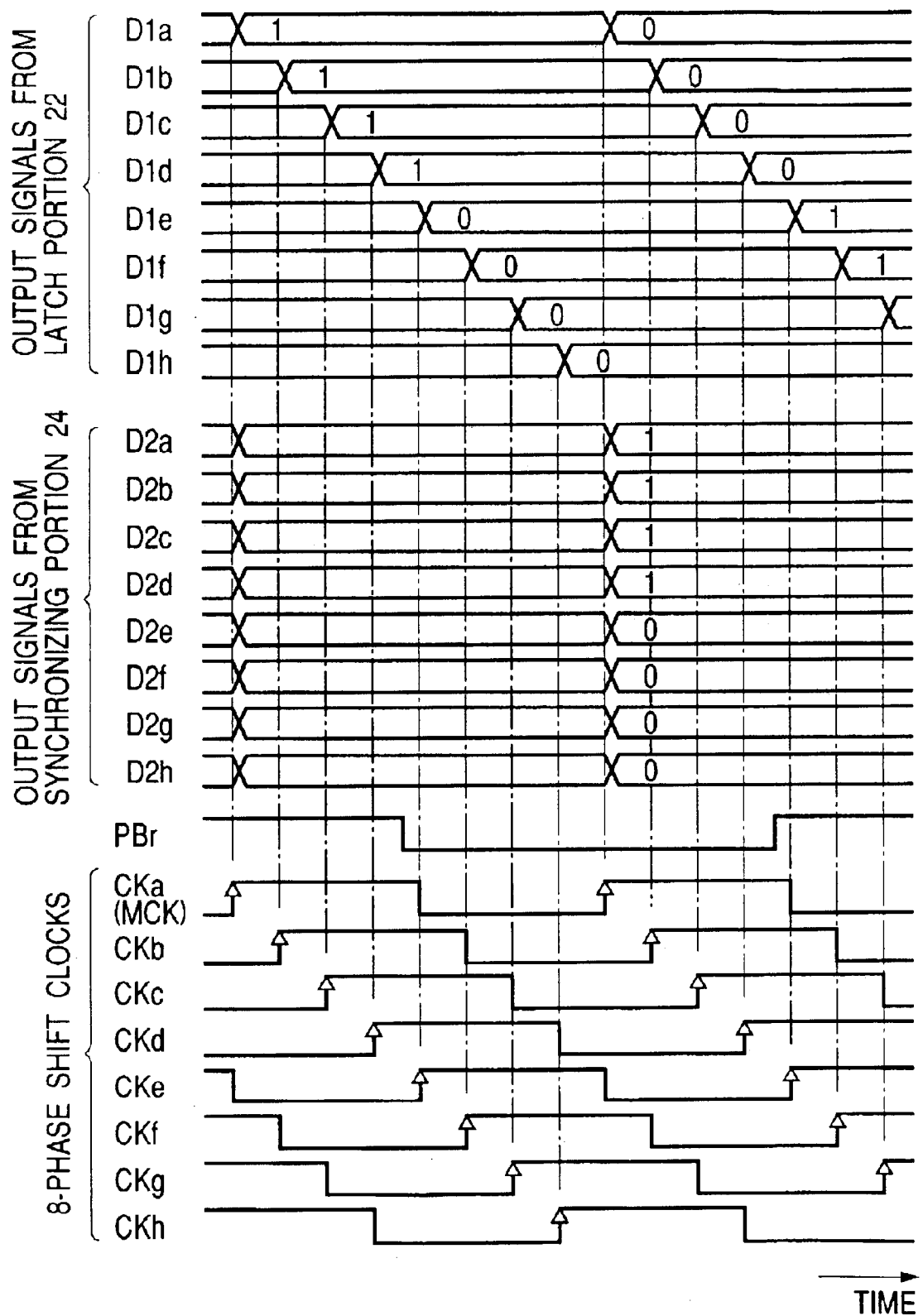
FIG. 3 is a time-domain diagram of signals occurring in the apparatus of FIG. 1.

The latch portion 22 receives the clock signals CKa, CKb, . . . , and CKh from the shift clock signal generating portion 20. The latch portion 22 includes 8 D flip-flops 22a, 22b, . . . , and 22h. The clock signals CKa, CKb, . . . , and CKh are fed to the D flip-flops 22a, 22b, . . . , and 22h as operation clock signals, respectively. On the other hand, the light reception pulse train (the binary signal) PBr is applied to the D input terminals of the D flip-flops 22a, 22b, . . . , and 22h. Thus, the D flip-flops 22a, 22b, . . . , and 22h latch the light reception pulse train PBr at the timings of rising edges in the clock signals CKa, CKb, . . . , and CKh, respectively. Therefore, as shown in FIG. 3, the D flip-flops 22a, 22b, . . . , and 22h output 8 different binary data D1a, D1b, . . . , and D1h, respectively. The binary data D1a, D1b, . . . , and D1h represent the signal level of the light reception pulse train PBr. The D flip-flops 22a, 22b, . . . , and 22h compose a signal inputting means.

A synchronizing portion 24 receives the binary data D1a, D1b, . . . , and D1h from the latch portion 22. The synchronizing portion 24 includes 8 D flip-flops 24a, 24b, . . . , and 24h. The reference clock signal MCK is fed from the reference clock signal generator 10 to the D flip-flops 24a, 24b, . . . , and 24h as an operation clock signal. On the other hand, the binary data D1a, D1b, . . . , and D1h are to the D input terminals of the D flip-flops 24a, 24b, . . . , and 24h, respectively. Thus, the D flip-flops 24a, 24b, . . . , and 24h simultaneously latch the respective binary data D1a, D1b, . . . , and D1h at the timing of every rising edge in the reference clock signal MCK. Accordingly, the D flip-flops 24a, 24b, . . . , and 24h convert the binary data D1a, D1b, . . . , and D1h into second binary data D2a, D2b, . . . , and D2h, respectively, which change synchronously with the reference clock signal MCK (see FIG. 3). In this way, the synchronizing portion 24 generates synchronized binary data D2a, D2b, . . . , and D2h. The D flip-flops 24a, 24b, . . . , and 24h output the binary data D2a, D2b, . . . , and D2h, respectively. The synchronizing portion 24 corresponds to a signal synchronizing means.

The binary data D2a, D2b, . . . , and D2h are fed via 8 buffers 26a, 26b, . . . , and 26h to 8 correlation devices 30a, 30b, . . . , and 30h, respectively. The correlation devices 30a, 30b, . . . , and 30h receive the reference clock signal MCK from the reference clock signal generator 10. The correlation devices 30a, 30b, . . . , and 30h periodically sample or capture the respective binary data D2a, D2b, . . . , and D2h in synchronism with the reference clock signal MCK.

Each of the correlation devices 30a, 30b, . . . , and 30h stores information about the PN code used by the pulse generating portion 12. Each of the correlation devices 30a, 30b, . . . , and 30h calculates the correlation between the PN code and the related binary data D2a, D2b, . . . , or D2h. The correlation devices 30a, 30b, . . . , and 30h output signals representing the calculated correlations, respectively. The correlation devices 30a, 30b, . . . , and 30h compose a correlation calculating means.

Two-phase adding portions 40a, 40b, . . . , and 40h receive the reference clock signal MCK from the reference clock signal generator 10. The two-phase adding portions 40a, 40b, . . . , and 40h operate in response to the reference clock signal MCK. The two-phase adding portions 40a, 40b, . . . , and 40h receive the correlation-representing signals from the correlation devices 30a, 30b, . . . , and 30h, respectively. The two-phase adding portion 40a receives the correlation-representing signal from the correlation device 30e which corresponds to a 180-degree phase delay from the correlation-representing signal outputted by the correlation device 30a. The two-phase adding portion 40a adds the correlations represented by the output signals from the correlation devices 30a and 30e to implement a correlation averaging process. The two-phase adding portion 40a outputs a signal representing the addition-resultant correlation (the average correlation). The two-phase adding portion 40b receives the correlation-representing signal from the correlation device 30f which corresponds to a 180-degree phase delay from the correlation-representing signal outputted by the correlation device 30b. The two-phase adding portion 40b adds the correlations represented by the output signals from the correlation devices 30b and 30f to implement a correlation averaging process. The two-phase adding portion 40b outputs a signal representing the addition-resultant correlation (the average correlation). The two-phase adding portion 40c receives the correlation-representing signal from the correlation device 30g which corresponds to a 180-degree phase delay from the correlation-representing signal outputted by the correlation device 30c. The two-phase adding portion 40c adds the correlations represented by the output signals from the correlation devices 30c and 30g to implement a correlation averaging process. The two-phase adding portion 40c outputs a signal representing the addition-resultant correlation (the average correlation). The two-phase adding portion 40d receives the correlation-representing signal from the correlation device 30h which corresponds to a 180 -degree phase delay from the correlation-representing signal outputted by the correlation device 30d. The two-phase adding portion 40d adds the correlations represented by the output signals from the correlation devices 30d and 30h to implement a correlation averaging process. The two-phase adding portion 40d outputs a signal representing the addition-resultant correlation (the average correlation). The two-phase adding portion 40e receives the correlation-representing signal from the correlation device 30a which corresponds to a 180-degree phase delay from the correlation-representing signal outputted by the correlation device 30e. The two-phase adding portion 40e adds the correlations represented by the output signals from the correlation devices 30e and 30a to implement a correlation averaging process. The output signal of the correlation device 30a which is used by the two-phase adding portion 40e has a 1-clock-pulse delay (a 360-degree phase delay) from that used by the two-phase adding portion 40a. Therefore, the addition-resultant correlation provided by the two-phase adding portion 40e differs from that provided by the two-phase adding portion 40a. The two-phase adding portion 40e outputs a signal representing the addition-resultant correlation (the average correlation). The two-phase adding portion 40f receives the correlation-representing signal from the correlation device 30b which corresponds to a 180-degree phase delay from the correlation-representing signal outputted by the correlation device 30f. The two-phase adding portion 40f adds the correlations represented by the output signals from the correlation devices 30f and 30b to implement a correlation averaging process. The output signal of the correlation device 30b which is used by the two-phase adding portion 40f has a 1-clock-pulse delay (a 360-degree phase delay) from that used by the two-phase adding portion 40b. Therefore, the addition-resultant correlation provided by the two-phase adding portion 40f differs from that provided by the two-phase adding portion 40b. The two-phase adding portion 40f outputs a signal representing the addition-resultant correlation (the average correlation). The two-phase adding portion 40g receives the correlation-representing signal from the correlation device 30c which corresponds to a 180-degree phase delay from the correlation-representing signal outputted by the correlation device 30g. The two-phase adding portion 40g adds the correlations represented by the output signals from the correlation devices 30g and 30c to implement a correlation averaging process. The output signal of the correlation device 30c which is used by the two-phase adding portion 40g has a 1-clock-pulse delay (a 360-degree phase delay) from that used by the two-phase adding portion 40c. Therefore, the addition-resultant correlation provided by the two-phase adding portion 40g differs from that provided by the two-phase adding portion 40c. The two-phase adding portion 40g outputs a signal representing the addition-resultant correlation (the average correlation). The two-phase adding portion 40h receives the correlation-representing signal from the correlation device 30d which corresponds to a 180-degree phase delay from the correlation-representing signal outputted by the correlation device 30h. The two-phase adding portion 40h adds the correlations represented by the output signals from the correlation devices 30h and 30d to implement a correlation averaging process. The output signal of the correlation device 30d which is used by the two-phase adding portion 40h has a 1-clock-pulse delay (a 360-degree phase delay) from that used by the two-phase adding portion 40d. Therefore, the addition-resultant correlation provided by the two-phase adding portion 40h differs from that provided by the two-phase adding portion 40d. The two-phase adding portion 40h outputs a signal representing the addition-resultant correlation (the average correlation). In this way, each of the two-phase adding portions 40a, 40b, . . . , and 40h averages the related correlations. The averaging prevents the finally calculated correlations from being greatly varied by noise. The two-phase adding portions 40a, 40b, . . . , and 40h compose an averaging means.

In the apparatus of FIG. 1, the light reception pulse train PBr is latched in response to the 8-phase clock signals CKa, CKb, . . . , and CKh so that the binary data D2a, D2b, . . . , and D2h applied to the correlation devices 30a, 30b, . . . , and 30h have timing differences corresponding to one eighth of the period of the reference clock signal MCK. Thereby, the moment at which the correlation between the light reception pulse train PBr and the PN code peaks is detected at a resolution of one eighth of the period of the reference clock signal MCK. In the case where the light reception pulse train PBr exactly corresponds to the light emission pulse train, the binary data D1a, D1b, . . . , and D1h outputted from the D flip-flops 22a, 22b, . . . , and 22h sequentially change in the same pattern. Specifically, the sequential change starts from the binary data outputted by one of the D flip-flops 22a, 22b, . . . , and 22h which responds to a specified clock signal having a rising edge at the earliest timing after the change of the light reception pulse train PBr to an effective state (an echo-indicating state). In FIG. 2, the clock signal CKe applied to the D flip-flop 22e corresponds to the specified one. Similarly, the correlations calculated by the correlation devices 30a, 30b, . . . , and 30h sequentially change in the same pattern. Specifically, the sequential change starts from the correlation calculated by one of the correlation devices 30a, 30b, . . . , and 30h which relates to the specified clock signal (for example, the clock signal CKe). In FIG. 2, the correlation device 30e relates to the specified clock signal CKe.

In the case where noise causes the light reception pulse train PBr to be out of exact correspondence with the light emission pulse train, the binary data D1a, D1b, . . . , and D1h outputted from the D flip-flops 22a, 22b, . . . , and 22h do not sequentially change in the same pattern. In this case, the correlations calculated by the correlation devices 30a, 30b, . . . , and 30h do not sequentially change in the same pattern. Generally, noise superimposed on the light reception pulse train PBr has an extremely short duration relative to the period of the reference clock signal MCK. Accordingly, pairs of the binary data D1a, D1b, . . . , and D1h which relate to clock signals having a 180-degree phase difference have common noise components at the lowest possibility. For example, in the case where the moment of occurrence of a peak of noise coincides with the operation timing of the D flip-flop 22e (that is, the timing of a rising edge of the clock signal CKa), the binary data D1a outputted from the D flip-flop 22a are most affected by the noise while the binary data D1e outputted from the D flip-flop 22e responding to the clock signal CKe having a 180-degree phase difference from the clock signal CKa are least affected thereby.

In the apparatus of FIG. 1, the 8-phase clock signals CKa, CKb, . . . , and CKh are in pairs each composed of clock signals having a 180-degree phase difference. Specifically, the clock signals CKa and CKe compose a first pair. The clock signals CKb and CKf compose a second pair. The clock signals CKc and CKg compose a third pair. The clock signals CKd and CKh compose a fourth pair. The correlation devices 30a and 30e correspond to the pair of the clock signals CKa and CKe. Thus, the correlation devices 30a and 30e are in a pair. The correlation devices 30b and 30f correspond to the pair of the clock signals CKb and CKf. Thus, the correlation devices 30b and 30f are in a pair. The correlation devices 30c and 30g correspond to the pair of the clock signals CKc and CKg. Thus, the correlation devices 30c and 30g are in a pair. The correlation devices 30d and 30h correspond to the pair of the clock signals CKd and CKh. Thus, the correlation devices 30d and 30h are in a pair. The two-phase adding portion 40a adds the correlations calculated by the correlation devices 30a and 30e, and hence averages them. The two-phase adding portion 40b adds the correlations calculated by the correlation devices 30b and 30f, and hence averages them. The two-phase adding portion 40c adds the correlations calculated by the correlation devices 30c and 30g, and hence averages them. The two-phase adding portion 40d adds the correlations calculated by the correlation devices 30d and 30h, and hence averages them. The two-phase adding portion 40e adds the correlations calculated by the correlation devices 30e and 30a, and hence averages them. The two-phase adding portion 40f adds the correlations calculated by the correlation devices 30f and 30b, and hence averages them. The two-phase adding portion 40g adds the correlations calculated by the correlation devices 30g and 30c, and hence averages them. The two-phase adding portion 40h adds the correlations calculated by the correlation devices 30h and 30d, and hence averages them. The averaging by the two-phase adding portions 40a, 40b, . . . , and 40h reduces or suppresses noise components of the finally calculated correlations.

The internal structures of the correlation devices 30a, 30b, . . . , and 30h are similar to each other. Also, the internal structures of the two-phase adding portions 40a, 40b, . . . , and 40h are similar to each other. The correlation device 30a and the two-phase adding portion 40a will be described below in more detail.

Figure 4:
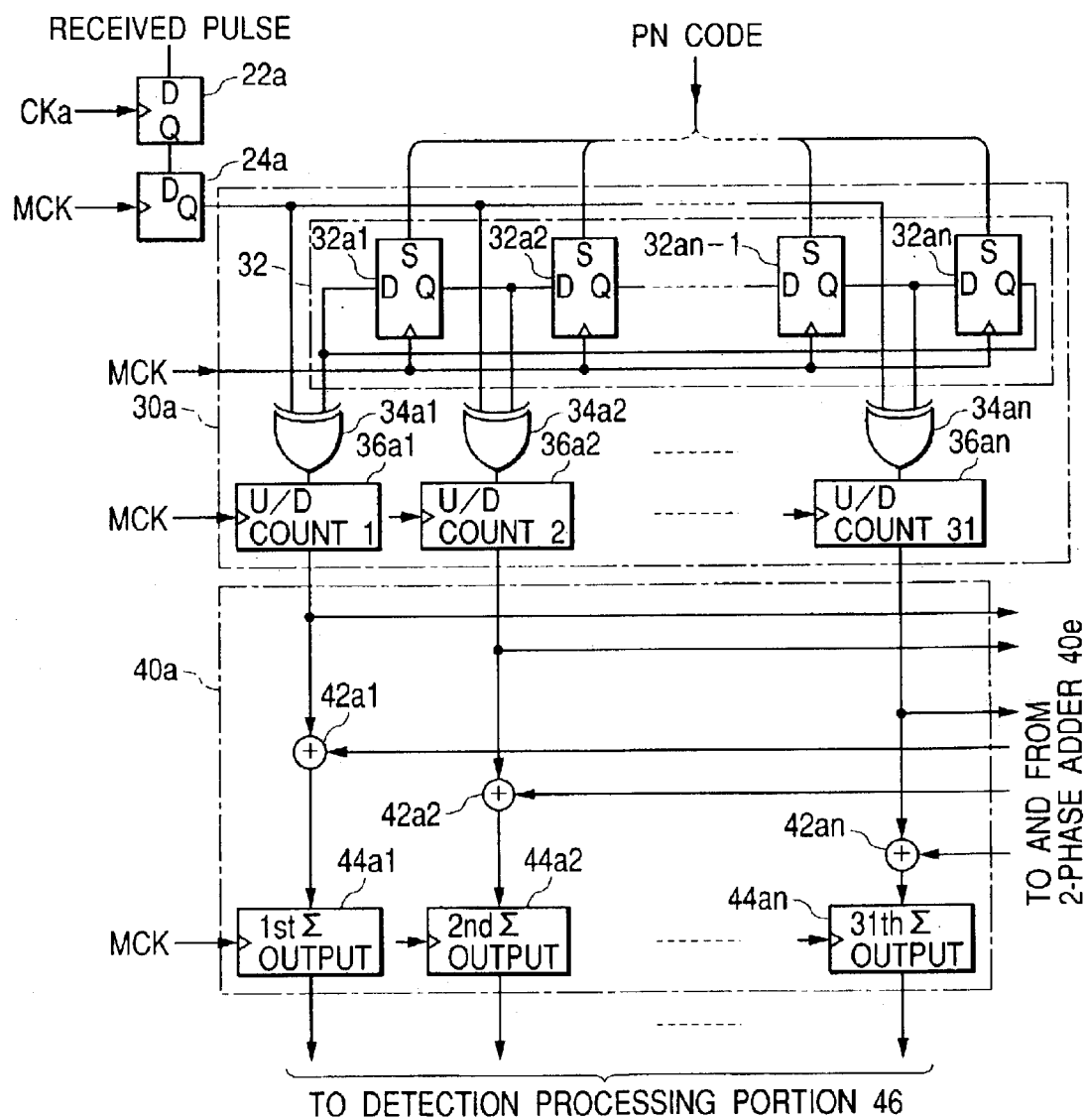
FIG. 4 is a block diagram of a correlation device and a two-phase adding portion in the apparatus of FIG. 1.

FIG. 4 shows the internal structures of the correlation device 30a and the two-phase adding portion 40a. As shown in FIG. 4, the correlation device 30a includes a shift register 32 composed of latch circuits 32a1, 32a2, . . . , and 32an connected in a ring or a closed loop, where "n" denotes a predetermined natural number (for example, 31). Before a distance measurement procedure is started, the CPU 2 (see FIG. 1) presets bits of the PN code in the latch circuits 32a1, 32a2, . . . , and 32an, respectively. The PN-code bits compose PN-code binary data. The reference clock signal MCK is applied to the latch circuits 32a1, 32a2, . . . , and 32an. During the distance measurement procedure, each of the PN-code bits is shifted from related one of the latch circuits 32a1, 32a2, . . . , and 32an to the next one in synchronism with the reference clock signal MCK. The latch circuits 32a1, 32a2, . . . , and 32an are connected in the closed loop, and the PN-code bit outputted from the last latch circuit 32an enters the first latch circuit 32a1.

As shown in FIG. 4, the correlation device 30a includes Exclusive-OR circuits 34a1, 34a2, . . . , and 34an, the total number of which is equal to that of the latch circuits 32a1, 32a2, . . . , and 32an. The PN-code binary data (the PN-code bits) inputted into the latch circuits 32a1, 32a2, . . . , and 32an are also applied to first input terminals of the Exclusive-OR circuits 34a1, 34a2, . . . , and 34an, respectively. For example, a portion of the PN-code binary data (a PN-code bit) which is inputted into the first latch circuit 32a1 is also applied to the first input terminal of the first Exclusive-OR circuit 34a1. A portion of the PN-code binary data (a PN-code bit) which is inputted into the second latch circuit 32a2 is also applied to the first input terminal of the second Exclusive-OR circuit 34a2. A portion of the PN-code binary data (a PN-code bit) which is inputted into the last latch circuit 32an is also applied to the first input terminal of the last Exclusive-OR circuit 34an. The binary data D2a generated by the D flip-flop 24a are applied in common to second input terminals of the Exclusive-OR circuits 34a1, 34a2, . . . , and 34an. It should be noted that the illustration of the buffer 26a is omitted from FIG. 4 for clarity. The binary data D2a originate from the binary data D1a which are generated by the D flip-flop 22a. As previously mentioned, the binary data D1a are produced by latching the light reception pulse train PBr at the timing of every rising edge of the clock signal CKa. Each of the Exclusive-OR circuits 34a1, 34a2, . . . , and 34an outputs a low level signal when the binary data D2a representative of the light reception pulse train PBr agree with the PN-code data inputted into a related latch circuit. Each of the Exclusive-OR circuits 34a1, 34a2, . . . , and 34an outputs a high level signal when the binary data D2a disagree with the PN-code data inputted into the related latch circuit.

The correlation device 30a further includes an array of up/down counters (U/D counters) 36a1, 36a2, . . . , and 36an, the total number of which is equal to that of the Exclusive-OR circuits 34a1, 34a2, . . . , and 34an. The U/D counters 36a1, 36a2, . . . , and 36an receive the output signals of the Exclusive-OR circuits 34a1, 34a2, . . . , and 34an, respectively. The U/D counters 36a1, 36a2, . . . , and 36an receive the reference clock signal MCK, and operate in response thereto. The count value given by each of the U/D counters 36a1, 36a2, . . . , and 36an increases as the output signal of the related Exclusive-OR circuit continues to be in its low level state. The count value given by each of the U/D counters 36a1, 36a2, . . . , and 36an decreases as the output signal of the related Exclusive-OR circuit continues to be in its high level state. The U/D counters 36a1, 36a2, . . . , and 36an output signals representative of the related count values, respectively. In the case where the binary data D2a represent an echo beam corresponding to a forward laser beam (an echo beam caused by reflection of a forward laser beam at a preceding target object), the binary data D2a continue to agree with the PN-code data inputted into one of the latch circuits 32a1, 32a2, . . . , and 32an. Accordingly, in this case, one of the U/D counters 36a1, 36a2, . . . , and 36an continues to count up. This U/D counter is referred to as the true U/D counter. The position of the true U/D counter relative to the U/D counter array indicates the moment of the arrival of the echo beam. In a first example of conditions where noise is superimposed on the binary data D2a, not only a true U/D counter but also another U/D counter continue to count up. In a second example, a true U/D counter fails to count up. Such problems are coped with by the two-phase adding portion 40a.

As shown in FIG. 4, the two-phase adding portion 40a includes adders 42a1, 42a2, . . . , and 42an, the total number of which is equal to that of the U/D counters 36a1, 36a2, . . . , and 36an. First input terminals of the adders 42a1, 42a2, . . . , and 42an receive the output signals of the U/D counters 36a1, 36a2, . . . , and 36an, respectively. Second input terminals of the adders 42a1, 42a2, . . . , and 42*an* receive the respective output signals of corresponding U/D counters in the correlation device 30*e* which pairs with the correlation device 30*a*. Each of the devices 42*a*1, 42*a*2, . . . , and 42*an* adds the count values represented by the output signals of the two related U/D counters, and outputs a signal indicative of the addition-resultant count value or the average count value. The addition suppresses a count value error caused by noise. The two-phase adding portion 40*a* includes output circuits 44*a*1, 44*a*2, and 44*an*, the total number of which is equal to that of the adders 42*a*1, 42*a*2, . . . , and 42*an*. The output circuits 44*a*1, 44*a*2, . . . , and 44*an* receive the output signals of the adders 42*a*1, 42*a*2, . . . , and 42*an*, respectively. The output circuits 44*a*1, 44*a*2, . . . , and 44*an* receive the reference clock signal MCK. The output circuits 44*a*1, 44*a*2, . . . , and 44*an* latch the respective output signals of the adders 42*a*1, 42*a*2, . . . , and 42*an* at the timing of every rising edge in the reference clock signal MCK, and feed the latched signals to a detection processing portion 46.

In more detail, each of the devices 42*a*1, 42*a*2, . . . , and 42*an* adds the count value given by the related U/D counter in the correlation device 30*a* and the count value given by the related U/D counter in the correlation device 30*e* which corresponds to a 180-degree phase delay relative to the former U/D counter. The 180-degree phase delay means the phase difference between the clock signals CKa and CKe (that is, the 180-degree phase difference or a half of the period of the reference clock signal MCK). For example, the device 42*a*1 adds the count value given by the first U/D counter 36*a*1 in the correlation device 30*a* and the count value given by the first U/D counter 36*e*1 (not shown) in the correlation device 30*e* which corresponds to a 180-degree phase delay relative to the U/D counter 36*a*1. The device 42*an* adds the count value given by the last U/D counter 36*an* in the correlation device 30*a* and the count value given by the last U/D counter 36*en* (not shown) in the correlation device 30*e* which corresponds to a 180-degree phase delay relative to the U/D counter 36*an*.

In the two-phase adding portion 40*e* which pairs with the two-phase adding portion 40*a*, each adder adds the count value given by the related U/D counter in the correlation device 30*e* and the count value given by the related U/D counter in the correlation device 30*a* which corresponds to a 180-degree phase delay relative to the former U/D counter. The 180-degree phase delay means the phase difference between the clock signals CKe and CKa (that is, the 180-degree phase difference or a half of the period of the reference clock signal MCK). For: example, the first adder 42*e*1 (not shown) in the two-phase adding portion 40*e* adds the count value given by the first U/D counter 36*e*1 (not shown) in the correlation device 30*e* and the count value given by the second U/D counter 36*a*2 in the correlation device 30*a* which corresponds to a 180-degree phase delay relative to the U/D counter 36*e*1. The last adder 42*en* in the two-phase adding portion 40*e* adds the count value given by the last U/D counter 36*en* (not shown) in the correlation device 30*e* and the count value given by the first U/D counter 36*a*1 in the correlation device 30*a* which corresponds to a 180-degree phase delay relative to the U/D counter 36*en*.

The two-phase adding portions 40*b*, 40*c*, and 40*d* operate similarly to the two-phase adding portion 40*a*. The two-phase adding potions 40*f*, 40*g*, and 40*h* operate similarly to the two-phase adding portion 40*e*. As understood from the previous description, the output signals of the two-phase adding portions 40*a* and 40*e* which form a pair are different from each other. The output signals of the two-phase adding portions 40*b* and 40*f* which form a pair are different from each other. The output signals of the two-phase adding portions 40*c* and 40*g* which form a pair are different from each other. The output signals of the two-phase adding portions 40*d* and 40*h* which form a pair are different from each other.

With reference back to FIG. 1, the detection processing portion 46 receives the signals representative of the "n" average count values (the "n" addition-resultant count values) from the output circuits in each of the two-phase adding portions 40*a*, 40*b*, . . . , and 40*h*. In connection with each of the two-phase adding portions 40*a*, 40*b*, . . . , and 40*h*, the detection processing portion 46 detects one among the "n" average count values which first exceeds a prescribed threshold value. The detection processing portion 46 determines the U/D counter corresponding to the detected average count value. The detection processing portion 46 generates a signal representative of the position of the determined U/D counter relative to the U/D counter array, that is, representative of the moment of the arrival of an echo beam caused by reflection of a transmitted forward laser beam at a preceding target object. In connection with each of the two-phase adding portions 40*a*, 40*b*, . . . , and 40*h*, the detection processing portion 46 outputs the echo-arrival-moment signal to a near-field priority processing portion 47. The "n" average count values indicate the correlations between the PN code and the results of the sampling of the light reception pulse train PBr at the respective timings of rising edges in the 8-phase clock signals CKa, CKb, . . . , and CKh. The detection processing portion 46 judges that a peak correlation value occurs when one of the "n" average count values exceeds the threshold value. The detection processing portion 46 determines the U/D counter corresponding to the average count value exceeding the threshold value. The detection processing portion 46 generates and outputs a signal representative of the position of the determined U/D counter relative to the U/D counter array, that is, representative of the moment of the arrival of an echo beam. The detection processing portion 46 can be initialized by the CPU 2.

For example, the detection processing portion 46 includes comparators for comparing the "n" average count values with the threshold value, a first decision device for detecting one among the "n" average count values which first exceeds the threshold value by referring to the output signals from the comparators, a memory loaded with information representative of the correspondence relation between the "n" average count values and the U/D counters, and a second decision device for determining the U/D counter corresponding to the detected average count value by referring to the information in the memory.

The near-field priority processing portion 47 selects one among the output signals of the detection processing portion 46 which represents the earliest moment of the arrival of an echo beam. In other words, the near-field priority processing portion 47 selects one among the output signals of the detection processing portion 46 which relates to a correlation device corresponding to a clock signal having the least phase difference from the reference clock signal MCK. The near-field priority processing portion 47 passes the selected echo-arrival-moment signal to a distance-measurement-result output portion 48. For example, the near-field priority processing portion 47 includes a comparator for comparing the echo arrival moments represented by the output signals of the detection processing portion 46 to determine the earliest one among the echo arrival moments, and a selector for selecting one of the output signals of the detection processing portion 46 which represents the earliest echo arrival moment. In the case where only one of the output signals of the detection processing portion 46 represents an echo arrival moment, the near-field priority processing portion 47 passes that signal to the distance-measurement-result output portion 48. In the case where two or more of the output signals of the detection processing portion 46 represent echo arrival moments, the near-field priority processing portion 47 selects the signal representative of the earliest one of the echo arrival moments and passes the selected signal to the distance-measurement-result output portion 48. The near-field priority processing portion 47 can be initialized by the CPU 2.

The distance-measurement-result output portion 48 converts the output signal (the echo-arrival-moment signal) of the near-field priority processing portion 47 into measured distance data representing the time interval between the moment of the transmission of a forward laser beam and the moment of the arrival of a corresponding echo beam. The distance-measurement-result output portion 48 feeds the measured distance data to the CPU 2. For example, the distance-measurement-result output portion 48 includes a calculator for computing, from the echo arrival moment, the time interval between the moment of the transmission of a forward laser beam and the moment of the arrival of a corresponding echo beam. The output signal of the near-field priority processing portion 47 indicates the position of one among all the U/D counters in the correlation devices 30a, 30b, . . . , and 30h which gives a count value first exceeding the threshold value. In other words, the output signal of the near-field priority processing portion 47 indicates the moment of the arrival of an echo beam. The timings of the latching of the light reception pulse PBr by the latch portion 22 in response to the 8-phase clock signals CKa, CKb, . . . , and CKh to generate the binary data D1a, D1b, . . . , and D1h are spaced at equal intervals corresponding to one eighth of the period of the reference clock signal MCK. The binary data D1a, D1b, . . . , and D1h are latched into the second binary data D2a, D2b, . . . , and D2h fed to the cofrelafion device's 30a, 30b, . . . , and 30h. Accordingly, the resolution of the time interval represented by the measured distance data outputted from the distance-measurement-result output portion 48 to the CPU 2 corresponds to one eighth of the period of the reference clock signal MCK. The distance-measurement-result output portion 48 can be initialized by the CPU 2.

The CPU 2 measures the distance to the preceding target object on the basis of the measured distance data. The resolution of the distance measurement is higher than that determined by the period of the reference clock signal MCK. The measured distance is used in controlling vehicle drive and brake systems to enable the present vehicle to automatically follow a preceding vehicle. Since the measured distance is high in resolution, the present vehicle is enabled to accurately follow the preceding vehicle. Also, the measured distance is used in an obstacle detection procedure of detecting an obstacle in front of the present vehicle and giving an alarm for the detected obstacle. Since the measured distance is high in resolution, the obstacle detection procedure is accurate and reliable.

The detection processing portion 46 corresponds to a detecting means. The near-field priority processing portion 47 corresponds to a selecting means.

Preferably, the apparatus of FIG. 1 includes a scanning device (not shown) which causes a prescribed angular range in front of the present vehicle to be scanned by the forward laser beam generated by the light emitting portion 14. The CPU 2 measures the distance to a preceding target object (for example, a preceding vehicle or an obstacle) in the scanned angular range by referring to the measured distance data outputted from the distance-measurement-result output portion 48. For each of predetermined distance-measurement angular points composing the scanned angular range, the CPU 2 executes a process for measuring a time interval a plurality of times so that a plurality of measured time intervals are available. The measured time intervals relate to the distance to a preceding target object. The CPU 2 averages the measured time intervals into a mean time interval. The CPU 2 measures the distance to the preceding target object by referring to the mean time interval. The CPU 2 acts as a distance calculating means.

Figure 5:
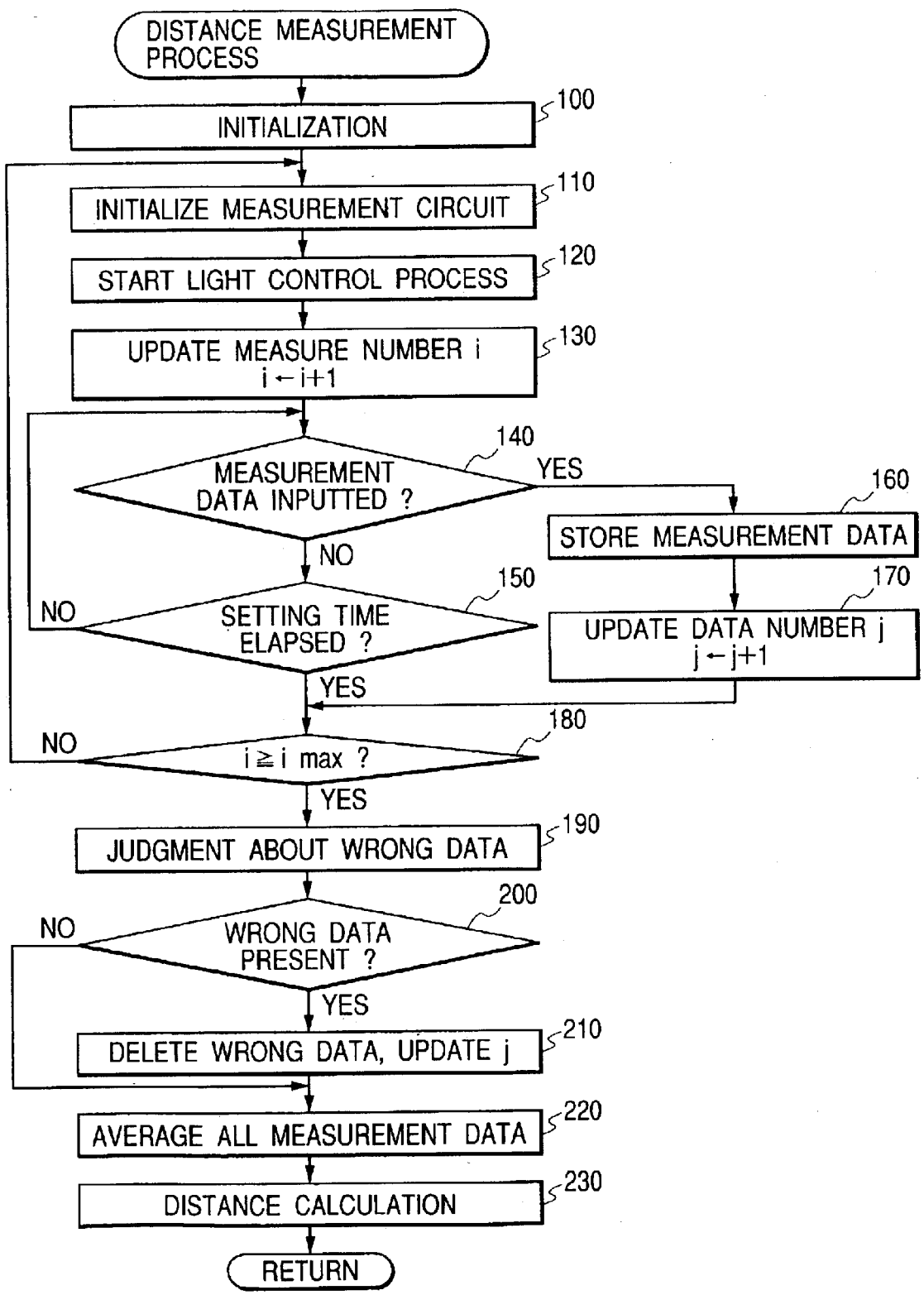
FIG. 5 is a flowchart of a distance-measurement-related segment of a control program for a CPU in FIG. 1.

The CPU 2 includes a combination of an input/output circuit, a processing section, a ROM, and a RAM. The CPU 2 operates in accordance with a program stored in the ROM. FIG. 5 is a flowchart of a distance-measurement-related segment of the program which is executed for each of the predetermined distance-measurement angular points. The program segment in FIG. 5 is started when the direction of the forward laser beam generated by the light emitting portion 14 reaches one of the predetermined distance-measurement angular points.

As shown in FIG. 5, a first step 100 of the program segment initializes variables and parameters including counter values (counter-indicating variables) "i" and "j". After the step 100, the program advances to a step 110.

The step 110 generates bits of the PN code, and sets the PN-code bits in the correlation devices 30a, 30b, . . . , and 30h. In addition, the step 110 implements measurement circuit initialization. Specifically, the step 110 initializes the detection processing portion 46, the near-field priority processing portion 47, and the distance-measurement-result output portion 48.

A step 120 following the step 110 outputs the PN-code bits to the pulse generating portion 12 in synchronism with the reference clock signal MCK to start a light control procedure for causing the light emitting portion 14 to output a forward laser beam responsive to the PN-code bits.

A step 130 subsequent to the step 120 increments the counter value "i" by "1". The counter value "i" indicates the number of times of the execution of the distance measurement for the present distance-measurement angular point. After the step 130, the program advances to a step 140.

The step 140 determines whether or not a measured distance data piece responsive to the outputted forward laser beam (that is, responsive to the execution of the step 120) has been fed from the distance-measurement-result output portion 48. When a measured distance data piece has not yet been fed, the program advances from the step 140 to a step 150. On the other hand, when a measured distance data piece has been fed, the program advances from the step 140 to a step 160.

The step 150 determines whether or not a preset distance measurement term from the moment of the execution of the step 120 has expired. When the preset distance measurement term has not yet expired, the program returns from the step 150 to the step 140. Accordingly, in this case, the step 140 is repeated. On the other hand, when the preset distance measurement term has expired, the program advances from the step 150 to a step 180.

The step 160 stores the measured distance data piece into the RAM. A step 170 following the step 160 increments the counter value "j" by "1". The counter value "j" indicates the number of available measured distance data pieces for the present distance-measurement angular point. After the step 170, the program advances to the step 180.

The step 180 determines whether or not the counter value "i" has reached a preset upper limit value "imax". When the counter value "i" has not yet reached the preset upper limit value "imax", the program returns from the step 180 to the step 110. Accordingly, in this case, the step 110 and the later steps are repeated. On the other hand, when the counter value "i" has reached the preset upper limit value "imax", the program advances from the step 180 to a step 190.

The step 190 detects ineffective one or ones (wrong one or ones) among the "j" measured distance data pieces. Specifically, the step 190 calculates a mean value among the time intervals represented by the "j" measured distance data pieces. The step 190 searches the time intervals represented by the "j" measured distance data pieces for a considerably off-centered one (or ones) which is spaced from the mean value by a prescribed value or more. The step 190 defines a measured distance data piece corresponding to such a considerably off-centered time interval as ineffective one (wrong one). Generally, a considerably off-centered time interval is caused by disturbance such as noise.

A step 200 subsequent to the step 190 determines whether or not ineffective one (or ones) is present among-the "j" measured distance data pieces on the basis of the result of the detection by the step 190. When an ineffective measured distance data piece is present, the program advances from the step 200 to a step 210. On the other hand, when an ineffective measured distance data piece is absent, the program jumps from the step 200 to a step 220.

The step 210 erases the ineffective one (or ones) from the measured distance data pieces in the RAM. The step 210 decrements the counter value "j" by the number of the erased measured distance data piece or pieces. Thus, the step 210 updates the counter value "j". After the step 210, the program advances to the step 220.

The step 220 reads out all the remaining measured distance data pieces from the RAM. The step 220 calculates a mean value (an average value) among the time intervals represented by the read-out measured distance data pieces. Specifically, the step 220 computes the sum of the time intervals represented by the read-out measured distance data pieces, and divides the computed sum by the counter number "j" to get the mean time interval (the average time interval).

A step 230 following the step 220 calculates the distance to a preceding target object from the mean time interval given by the step 220 for the present distance-measurement angular point. The step 230 stores information representative of the calculated distance into the RAM. After the step 230, the current execution cycle of the program segment ends.

In the case where the RAM does not have any measured distance data piece, that is, in the case where a preceding target object is absent from the present distance-measurement angular point, the step 220 sets a distance-data-absence flag. In this case, the step 230 responds to the distance-data-absence flag, and stores information into the RAM which represents the absence of a preceding target object from the present distance-measurement angular point.

As previously mentioned, in the apparatus of FIG. 1, the shift clock generating portion 20 produces the 8-phase clock signals CKa, CKb, . . . , and CKh in response to the reference clock signal MCK. The D flip-flops 22a, 22b, . . . , and 22h in the latch portion 22 sequentially latch the light reception pulse train PBr in response to the 8-phase clock signals CKa, CKb, . . . , and CKh at timings spaced at equal intervals corresponding to one eighth of the period of the reference clock signal MCK. The D flip-flops 22a, 22b, . . . , and 22h output the latching-resultant binary data D1a, D1b, . . . , and D1h, respectively. The D flip-flops 24a, 24b, . . . , and 24h in the synchronizing portion 24 respond to the reference clock signal MCK, and convert the binary data D1a, D1b, . . . , and D1h into the synchronized binary data D2a, D2b, . . . , and D2h respectively. Each of the correlation devices 30a, 30b, . . . , and 30h calculates the correlation between the PN code and the related binary data D2a, D2b, . . . , or D2h. One among the calculated correlations which first exceeds the threshold value is detected as an indication of the moment of the arrival of an echo beam caused by reflection of a forward laser beam at a preceding target object. The echo arrival moment is used in measuring the time interval between the moment of the transmission of the forward laser beam and the moment of the arrival of the corresponding echo beam. The resolution of the time-interval measurement corresponds to one eighth of the period of the reference clock signal MCK. Therefore, it is possible to accurately measure the distance to a preceding target object.

The high resolution of the time-interval measurement is provided without increasing the frequency of the reference clock signal MCK. Accordingly, it is sufficient that circuits for the time-interval measurement operate at a period equal to that of the reference clock signal MCK. Therefore, the circuits for the time-interval measurement can be inexpensive.

As previously mentioned, in the apparatus of FIG. 1, the correlation devices 30a, 30b, . . . , and 30h and the later-stage circuits (the two-phase adding portions 40a, 40b, . . . , and 40h, the detection processing portion 46, the near-field priority processing portion 47, and the distance-measurement-result output portion 48) operate in response to the common reference clock signal MCK. It is unnecessary to feed the 8-phase clock signals CKa, CKb, . . . , and CKh to the processing circuits except the D flip-flops 22a, 22b, . . . , and 22h. Accordingly, a wiring pattern of a time-interval measuring circuit on a printed board can easily be designed. Furthermore, the wiring pattern can be simple. Thus, a small-sized printed board suffices.

As previously mentioned, in the apparatus of FIG. 1, the two-phase adding portions 40a, 40b, . . . , and 40h add the correlations in pairs which are calculated by the correlation devices 30a, 30b, . . . , and 30h. The addition-resultant correlations are used in determining the moment of the arrival of an echo beam caused by reflection of a forward laser beam at a preceding target object. The additions executed by the two-phase adding portions 40a, 40b, . . . , and 40h enhance anti-noise performances of the time-interval measurement. Therefore, the time-interval measurement is accurate even when the S/N (signal-to-noise) ratio of the light reception pulse train PBr is relatively low.

For each distance-measurement angular point, the CPU 2 executes a process for outputting a PN-code-responsive forward laser beam from the light emitting portion 14 and measuring a time interval a plurality of times so that a plurality of measured time intervals are available. The measured time intervals relate to the distance to a preceding target object. The CPU 2 averages the measured time intervals into a mean time interval. The CPU 2 measures the distance to the preceding target object by referring to the mean time interval. Before the averaging of the measured time intervals, the CPU 2 deletes ineffective one (or ones) from the measured distance data pieces. Accordingly, the anti-noise performances of the time-interval measurement are further enhanced. Therefore, the time-interval measurement is more accurate even when the S/N (signal-to-noise) ratio of the light reception pulse train PBr is relatively low.

Figure 6:
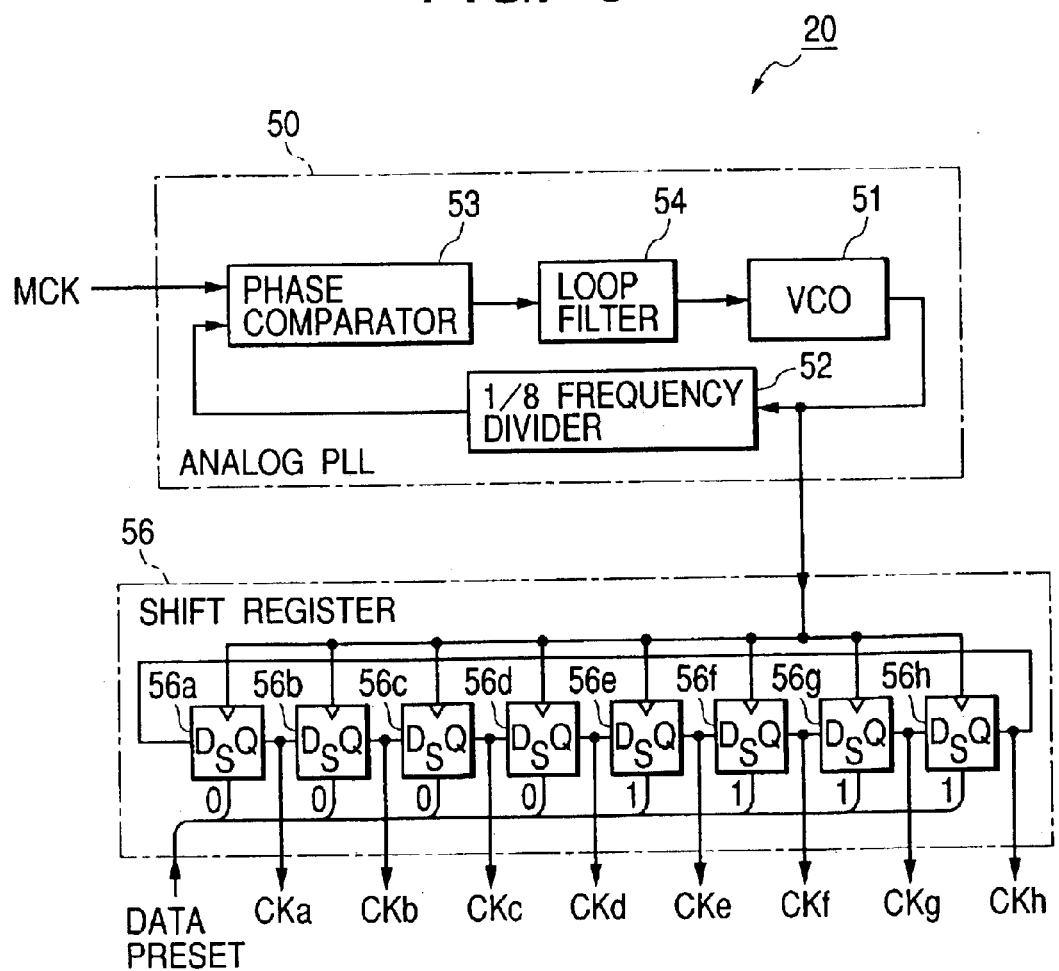
FIG. 6 is a block diagram of a first example of a shift clock signal generating portion in FIG. 1.

FIG. 6 shows a first example of the shift clock signal generating portion 20. As shown in FIG. 6, the shift clock signal generating portion 20 includes an analog PLL (phase locked loop) 50 and a shift register 56 of a ring type or a closed-loop type. The analog PLL 50 generates a clock signal having a frequency equal to 8 times the frequency of the reference clock signal MCK. The analog PLL 50 outputs the high-frequency clock signal to the shift register 56. The high-frequency clock signal drives shifting elements in the shift register 56 so that the 8-phase clock signals CKa, CKb, . . . , and CKh appear at the output terminals of the shifting elements respectively. The shift register 56 outputs the 8-phase clock signals CKa, CKb, . . . , and CKh.

The analog PLL 50 includes a VCO (a voltage controlled oscillator) 51, a frequency divider 52, a phase comparator 53, and a loop filter 54. The VCO 51 outputs a signal having a frequency depending on a control voltage. The device 52 divides the frequency of the output signal of the VCO 51 by eight. The frequency divider 52 outputs the frequency-division-resultant signal to the phase comparator 53. The device 53 compares the phase of the reference clock signal MCK and the phase of the output signal of the frequency divider 52, thereby generating a primary control signal depending on the phase difference of the output signal of the frequency divider 52 from the reference clock signal MCK. The phase comparator 53 outputs the primary control signal to the loop filter 54. The loop filter 54 integrates or filters the primary control signal into the control voltage. The loop filter 54 applies the control voltage to the VCO 51. Thus, the frequency of the output signal of the VCO 51 is controlled at 8 times the frequency of the reference clock signal MCK. The output signal of the VCO 51 is applied to the shift register 56 as the high-frequency clock signal.

The shift register 56 includes 8 latch circuits 56a, 56b, . . . , and 56h connected in a closed loop. The CPU 2 (see FIG. 1) presets binary data pieces, for example, "00001111", in the latch circuits 56a, 56b, . . . , and 56h, respectively. The latch circuits 56a, 56b, . . . , and 56h are driven by the high-frequency clock signal so that the binary data pieces are shifted thereby and circulate through the closed loop. Accordingly, the 8-phase clock signals CKa, CKb, . . . , and CKh appear at the output terminals of the latch circuits 56a, 56b, . . . , and 56h, respectively. The shift register 56 outputs the 8-phase clock signals CKa, CKb, . . . , and CKh.

After the binary data pieces are preset in the latch circuits 56a, 56b, . . . , and 56h of the shift register 56, the start timing of the application of the high-frequency clock signal from the analog PLL 50 to the shift register 56 is controlled in response to the timing of a rising edge in the reference clock signal MCK. This control enables the phase of the first clock signal CKa to be equal to that of the reference clock signal MCK.

Figure 7:
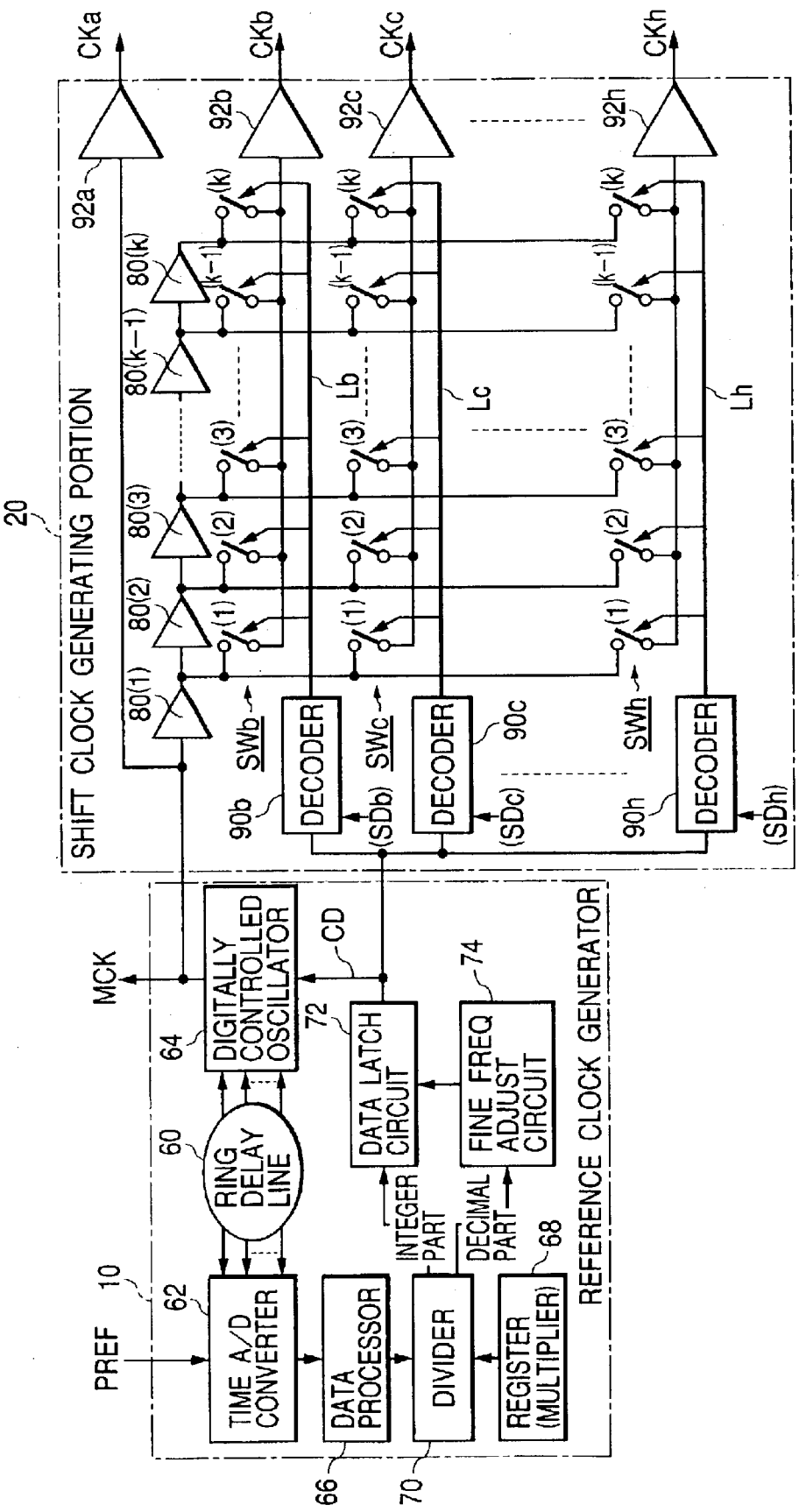
FIG. 7 is a diagram of an example of a reference clock signal generator and a second example of the shift clock signal generating portion in FIG. 1.

FIG. 7 shows a second example of the shift clock signal generating portion 20. As shown in FIG. 7, the shift clock signal generating portion 20 includes delay units 80(1), 80(2), . . . , and 80(k) connected in cascade or series to compose a delay line, where "k" denotes a predetermined natural number. The reference clock signal MCK outputted from the reference clock signal generator 10 successively propagates through the delay units 80(1), 80(2), . . . , and 80(k) while being delayed thereby. First ends of switches SWb(1), SWb(2), . . . , and SWb(k) are connected to the output terminals of the delay units 80(1), 80(2), . . . , and 80(k), respectively. Second ends of the switches SWb(1), SWb(2), . . . , and SWb(k) are connected to a signal output path. Similarly, first ends of switches SWc(1), SWc(2), . . . , and SWc(k), . . . , and SWh(1), SWh(2), . . . , and SWh(k) are connected to the output terminals of the delay units 80(1), 80(2), . . . , and 80(k). Second ends of the switches SWc(1), SWc(2), . . . , and SWc(k), . . . , and SWh(1), SWh(2), . . . , and SWh(k) are connected to signal output paths. The switches SWb(1), SWb(2), . . . , and SWb(k), SWc(1), SWc(2), . . . , and SWc(k), . . . , and SWh(1), SWh(2), . . . , and SWh(k) operate for taking out the clock signals CKb, CKc, . . . , and CKh, respectively. The phases of the clock signals CKb, CKc, . . . , and CKh differ from the phase of the reference clock signal MCK. Decoders 90b, 90c, . . . , and 90h are connected with the group of the switches SWb(1), SWb(2), . . . , and SWb(k), the group of the switches SWc(1), SWc(2), . . . , and SWc(k), . . . , and the group of the switches SWh(1), SWh(2), . . . , and SWh(k) via data lines Lb, Lc, . . . , and Lh, respectively.

The decoder 90b determines the position of specified one SWb(?) among the switches SWb(1), SWb(2), ., and SWb(k) via which the clock signal CKb should be taken out. The decoder 90b applies a drive signal to the group of the switches SWb(1), SWb(2), . . . , and SWb(k) via the data line Lb which turns on the specified switch SWb(?) and turns off the other switches. The decoders 90c, . . . , and 90h operate similarly to the decoder 90b. Accordingly, the decoders 90b, 90c, . . . , and 90h determine the positions of specified ones SWb(?), SWc(?), . . . , and SWh(?) among the switches SWb(1), SWb(2), . . . , and SWb(k), SWc(1), SWc(2), . . . , and SWc(k), . . . , and SWh(1), SWh(2), . . . , and SWh(k) via which the clock signals CKb, CKc, . . . , and CKh should be taken out. The decoders 90b, 90c, . . . , and 90h apply drive signals to the switch groups via the data lines Lb, Lc, . . . , and Lh which turn on the specified switches SWb(?), SWc(?), . . . , and SWh(?), and turn off the other switches. Seven ones are selected among delayed signals generated by the delay units 80(1), 80(2), . . . , and 80(k). The selected signals propagate through the specified switches SWb(?), SWc(?), . . . , and SWh(?), being taken out as the clock signals CKb, CKc, . . . , and CKh.

The reference clock signal generator 10 converts the period of the reference clock signal MCK into a numeric value while using the signal delay time (the mean signal delay time) provided by each of the delay units 80(1), 80(2), . . . , and 80(k) as a time resolution. The reference clock signal generator 10 produces period data CD representing the numeric value of the period of the reference clock signal MCK. The reference clock signal generator 10 feeds the period data CD to the decoders 90b, 90c, . . . , and 90h. The CPU 2 (see FIG. 1) feeds delay data SDb, SDc, . . . , and SDh to the decoders 90b, 90c, . . . , and 90h, respectively. The delay data SDb, SDc, . . . , and SDh indicate the delay ratios "x/8" (x:1, 2, . . . , 7) of the clock signals CKb, CKc, . . . , and CKh with respect to the reference clock signal MCK. The delay data SDb, SDc, . . . , and SDh are also referred to as the ratio data SDb, SDc, . . . , and SDh. The decoders 90b, 90c, . . . , and 90h calculate the positions of the specified switches Swb(?), SWc(?), . . . , and SWh(?) for taking out the clock signals CKb, CKc, . . . , and CKh by using the period data CD and the delay data (the ratio data) SDb, SDc, . . . , and SDh. The decoders 90b, 90c, . . . , and 90h turn on the specified switches SWb(?), SWc(?), . . . , and SWh(?). The specified switches SWb(?), SWc(?), . . . , and SWh(?) output the clock signals CKb, CKc, . . . , and CKh, respectively. The clock signals CKb, CKc, . . . , and CKh result from delaying the reference clock signal MCK by time intervals among which there are differences equal to one eighth of the period of the reference clock signal MCK.

In the case where the period of the reference clock signal MCK is equal to 80 times the signal delay time provided by each of the delay units 80(1), 80(2), . . . , and 80(k), the period data CD representing the numeric value "80" are fed to the decoders 90b, 90c, . . . , and 90h. By using the period data CD and the delay data SDb, SDc, . . . , and SDh, the decoders 90b, 90c, . . . , and 90h calculate delay quantities for the clock signals CKb, CKc, . . . , and CKh as "80/8", "80•2/8", . . . , and "80•7/8", respectively. The decoders 90b, 90c, . . . , and 90h detect specified switches SWb(10), SWc(20), . . . , and SWh(70) corresponding to the calculated delay quantities, respectively. The decoders 90b, 90c, and 90h turn on the specified switches SWb(10), SWc(20), . . . , and SWh(70). In the case where the frequency of the reference clock signal MCK is 20 MHz (the period of the reference clock signal MCK is 50 nsec) and the signal delay time provided by each of the delay units 80(1), 80(2), . . . , and 80(k) is 1 nsec, the numeric value represented by the period data CD is 50.

As shown in FIG. 7, the shift clock signal generating portion further includes buffers 92a, 92b, 92c, . . . , and 92h. The reference clock signal MCK propagates through the buffer 92a, being taken out toward an external as the clock signal Cka having a phase equal to that of the reference clock signal MCK. The buffers 92b, 92c, . . . , and 92h follow the group of the switches SWb(1), SWb(2), . . . , and SWb(k), the group of the switches SWc(1), SWc(2), . . . , and SWc(k), . . . , and the group of the switches SWh(1), SWh(2), . . . , and SWh(k), respectively. The clock signals CKb, CKc, . . . , and CKh propagate through the specified switches SWb(?), SWc(?), . . . , and Swh(?), and the buffers 92b, 92c, . . . , and 92h, being taken out toward an external. The clock signals CKb, CKc, . . . , and CKh have phases different from the phase of the reference clock signal MCK. In this way, the 8-phase clock signals CKa, CKb, . . . , and CKh are outputted to the external, that is, the latch portion 22.

Each of the delay units 80(1), 80(2), . . . , and 80(k) is composed, of two inverters connected in cascade or series. Alternatively, each of the delay units 80(1), 80(2), . . . , and 80(k) may be formed by a gate circuit such as an AND gate or a NAND gate.

The period data CD may be generated by a time A/D converting circuit (a time A/D converting portion) which includes delay elements equal in structure and characteristics to the delay units 80(1), 80(2) . . . , and 80(k), and which uses the delay elements to convert the period of the reference clock signal MCK into a numeric value. The time A/D converting circuit (the time A/D converting portion) is shown, for example, in U.S. Pat. No. 6,218,982 B1, the disclosure of which is hereby incorporated by reference.

As shown in FIG. 7, the reference clock signal generator 10 receives a basic clock signal PREF from a suitable device (not shown). The basic clock signal PREF has a fixed frequency lower than the frequency of the reference clock signal MCK. The reference clock signal generator 10 implements digital signal processing by which the frequency of the low-frequency clock signal PREF is multiplied to get the reference clock signal MCK. The reference clock signal generator 10 includes a ring delay line 60 composed of delay units connected in a ring and being equal in structure and characteristics to the delay units 80(1), 80(2), . . . , and 80(k) in the shift clock signal generating portion 20. A pulse is inputted into the ring delay line 60 from a suitable external device (not shown). The pulse circulates through the ring delay line 60 while being delayed by the delay units therein. The output signals from the respective delay units in the ring delay line 60 are fed to the next-stage delay units, a time A/D converter 62, and a digitally controlled oscillator 64.

The time A/D converter 62 includes a counter and an encoder. The counter measures the number of times the pulse goes round the ring delay line 60. The encoder detects the position of the pulse in the ring delay line 60 at a timing of every rising edge (or every falling edge) in the low-frequency clock signal PREF. Data generated by the counter are used as higher-bit data indicating the measured number of times the pulse goes round the ring delay line 60. Data generated by the encoder are used as lower-bit data indicating the detected position of the pulse in the ring delay line 60. The higher-bit data and the lower-bit data are combined into digital data having a prescribed number of bits. The time A/D converter 62 outputs the digital data to a data processor 66. In other words, the time A/D converter 62 accesses the ring delay line 60 and thereby measures the moment of the occurrence of every rising edge (or every falling edge) in the low-frequency clock signal PREF while using the signal delay time provided by each of the delay units in the ring delay line 60 as a time resolution. The time A/D converter 62 generates and outputs digital data representing each measured moment. The output data from the-time A/D converter 62 are referred to as the moment data.

The data processor 66 receives the moment data from the time A/D converter 62. The data processor 66 calculates the difference between neighboring measured moments represented by the moment data, and generates data representing the period of the low-frequency clock signal PREF. The data processor 66 outputs the PREF-period data to a divider 70. Therefore, the divider 70 is informed of the period of the low-frequency clock signal PREF. A register 68 is previously loaded with data representing a frequency multiplier for generating the reference clock signal MCK from the low-frequency clock signal PREF. The register 68 outputs the frequency-multiplier data to the divider 70. Therefore, the divider 70 is informed of the frequency multiplier. The device 70 divides the period of the low-frequency clock signal PREF by the frequency multiplier to calculate the period of the reference clock signal MCK. The divider 70 outputs data representative of the integer part of the division result to a data latch circuit 72. The divider 70 outputs data representative of the decimal part of the division result to a fine frequency adjustment circuit 74.

The data latch circuit 72 latches the integer-part output data from the divider 70, thereby generating the period data CD. The data latch circuit 72 outputs the period data CD to the digitally controlled oscillator 64 as control data therefor. In addition, the data latch circuit 72 outputs the period data CD to the decoders 90b, 90c, . . . , and 90h in the shift clock signal generating portion 20. The digitally controlled oscillator 64 is similar in design to the time A/D converter 62. The digitally controlled oscillator 64 accesses the ring delay line 60. The digitally controlled oscillator 64 monitors the number of times the pulse goes round the ring delay line 60 and also the position of the pulse in the ring delay line 60. With reference to the monitored information, the digitally controlled oscillator 64 measures the time interval corresponding to the period data (the control data) CD while using the signal delay time provided by each of the delay units in the ring delay line 60 as a time resolution. The digitally controlled oscillator 64 generates and outputs a pulse signal per time-interval measurement as a unit time segment of the reference clock signal MCK. In this way, the digitally controlled oscillator 64 generates and outputs the reference clock signal MCK.

The fine frequency adjustment circuit 74 adds "1" to the latched data in the data latch circuit 72 at a rate corresponding to the decimal part of the division result which is represented by the decimal-part output data from the divider 70. The data latch circuit 72 outputs the addition-resultant data as the period data (the control data) CD. The addition implemented by the fine frequency adjustment circuit 74 prevents a buildup of the phase error of the reference clock signal MCK from the low-frequency clock signal PREF.

The ring delay line 60, the time A/D converter 62, the digitally controlled oscillator 64, and the other related devices and circuits compose a digital PLL. The digital PLL is shown, for example, in U.S. Pat. No. 5,477,196, the disclosure of which is hereby incorporated by reference. The control data (the period data) CD outputted from the data latch circuit 72 to the digitally controlled oscillator 64 represent the numeric value of the period of the reference clock signal MCK with a time resolution equal to the signal delay time provided by each of the delay units 80(1), 80(2), . . . , and 80(k) in the shift clock signal generating portion 20. As previously mentioned, the period data (the control data) CD outputted from the data latch circuit 72 are fed to the decoders 90b, 90c, . . . , and 90h in the shift clock signal generating portion 20.

The delay units composing the ring delay line 60 are equal in structure and characteristics to the delay units 80(1), 80(2), . . . , and 80(k) in the shift clock signal generating portion 20. Therefore, the temperature dependency of the signal delay time provided by each of the delay units composing the ring delay line 60 is equal to that of the signal delay time provided by each of the delay units 80(1), 80(2), . . . , and 80(k). Accordingly, it is possible to compensate for the temperature dependencies of the phases of the clock signals CKa, CKb, . . . , and CKh relative to the phase of the reference clock signal MCK.

The reference clock signal generator 10 corresponds to a digitally controlled oscillation circuit. The time A/D converter 62 acts as a time A/D converting means. The divider 70 acts as a dividing means. The digitally controlled oscillator 64 acts as a signal outputting means.

The combination of the delay units 80(1), 80(2), . . . , and 80(k), the switches SWb(1), SWb(2), . . . , and SWb(k), and the decoder 90b can be used as a phase shift circuit for generating a clock signal having a desired phase difference from the reference clock signal MCK.

Second Embodiment

A second embodiment of this invention is similar to the first embodiment thereof except that the shift clock signal generating portion 20 is designed to generate different-phase clock signals, the total number of which differs from 8. In order to generate 9-phase or more-phase clock signals, the total number of D flip-flops in the latch portion 22 and the total number of correlation devices are increased from 8 accordingly. In this case, a higher resolution of the time-interval measurement or the distance measurement is attained. In order to generate 7-phase or less-phase clock signals, the total number of D flip-flops in the latch portion 22 and the total number of correlation devices are decreased from 8 accordingly. In this case, a smaller-sized apparatus structure can be provided.

In the case where 7-phase or less-phase clock signals are generated, the number of times of the execution of the distance measurement for each distance-measurement angular point may be increased.

Preferably, the total number of distance-measurement angular points and the term for distance measurement covering all the distance-measurement angular points are previously decided according to the size and driving performance of the present vehicle. A time interval assigned to distance measurement at one distance-measurement angular point has an upper limit. Therefore, the number of times of the execution of the distance measurement for each distance-measurement angular point is limited by the above-mentioned assigned time interval. For the control of the present vehicle to automatically follow a preceding vehicle, a time interval assigned to distance measurement at one distance-measurement angular point is preferably in the range of 5 μsec to 50 μsec. The number of times of the execution of the distance measurement for each distance-measurement angular point is preset according to the above-mentioned assigned time interval and a time interval spent in the single execution of the distance measurement. To attain a high accuracy of distance measurement, the number of times of the execution of the distance measurement for each distance-measurement angular point is preset to a relatively large value.

Third Embodiment

A third embodiment of this invention is a modification of the first or second embodiment thereof. The third embodiment of this invention relates to a first system or a second system designed as follows.

The first system includes a sensor, a transmitter, a receiver, and a time-interval measurement device. The sensor acts to detect an object to be measured. When the sensor detects an object, the transmitter generates a radio-wave detection signal in a spread spectrum technique and sends the generated signal. The receiver catches the detection signal. The time-interval measurement device measures the time interval between the measurement start moment and the moment of the catch of the detection signal. The time-interval measurement device uses corresponding one in the first or second embodiment of this invention.

The second system includes a transmitter, a receiver, and a time-interval measurement device. The transmitter sends a train of detection signals. The receiver catches the detection signals. The time-interval measurement device measures the time intervals between the moments of the catch of the detection signals. The time-interval measurement device uses corresponding one in the first or second embodiment of this invention.

Fourth Embodiment

A fourth embodiment of this invention is a modification of the first or second embodiment thereof. In the fourth embodiment of this invention, the reference clock signal generator 10 includes an oscillator for generating and outputting the reference clock signal MCK, and a time A/D converter receives the reference clock signal MCK from the oscillator. The time A/D converter changes the period of the reference clock signal MCK into a numeric value, and generates period data CD representative of the numeric value. The time A/D converter feeds the period data CD to the shift clock generating portion 20.

The time A/D converter includes a ring delay line 60 composed of delay units connected in a ring and being equal in structure and characteristics to the delay units 80(1), 80(2), . . . , and 80(k) in the shift clock signal generating portion 20. The time A/D converter further includes a counter for measuring the number of times a pulse goes round the ring delay line 60, and an encoder for detecting the position of the pulse in the ring delay line 60 at a prescribed timing. Data generated by the counter and data generated by the encoder are used in changing the period of the reference clock signal MCK into the numeric value.

Fifth Embodiment

Figure 8:
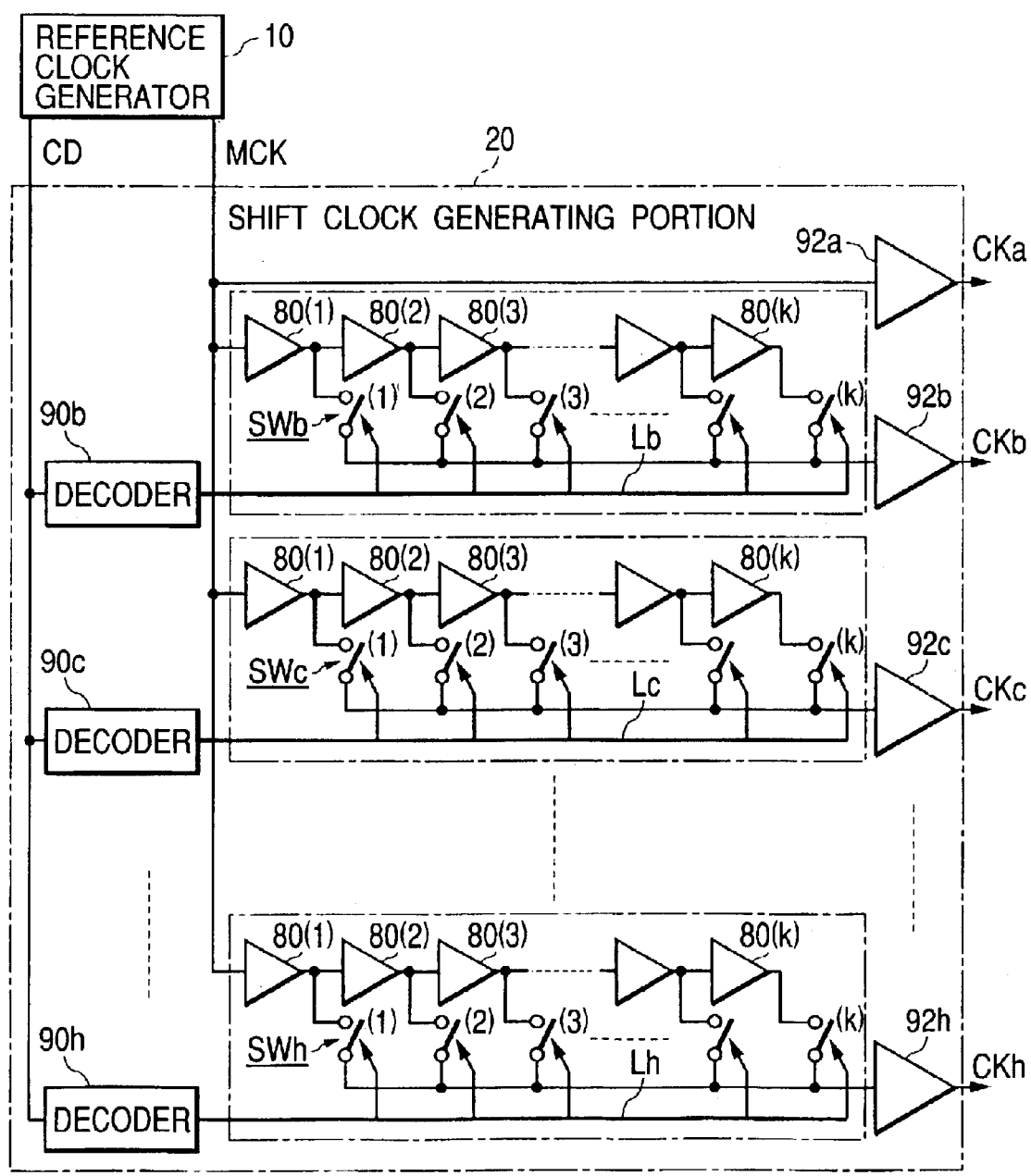
FIG. 8 is a diagram of a shift clock generating portion in a fifth embodiment of this invention.

A fifth embodiment of this invention is similar to the first embodiment thereof except that the shift clock generating portion is modified as follows. FIG. 8 shows the shift clock generating portion 20 in the fifth embodiment of this invention. The shift clock signal generating portion 20 in FIG. 8 includes delay lines for the clock signals CKb, CKc, . . . , and CKh, respectively. Each of the delay lines is composed of delay units 80(1), 80(2), . . . , and 80(k) connected in cascade or series. Regarding the clock signal CKb, the switches SWb(1), SWb(2), . . . , and SWb(k) are connected to the output terminals of the corresponding delay units 80(1), 80(2), . . . , and 80(k), respectively. Regarding the clock signal CKc, the switches SWc(1), SWc(2), . . . , and SWc(k) are connected to the output terminals of the corresponding delay units 80(1), 80(2), . . . , and 80(k), respectively. Similarly, regarding the clock signals CKd, . . . , and CKh, the switches SWd(1), SWd(2), . . . , and SWd(k), . . . , and SWh(1), SWh(2), . . . , and SWh(k) are connected to the output terminals of the corresponding delay units 80(1), 80(2), . . . , and 80(k).

Sixth Embodiment

Figure 9:
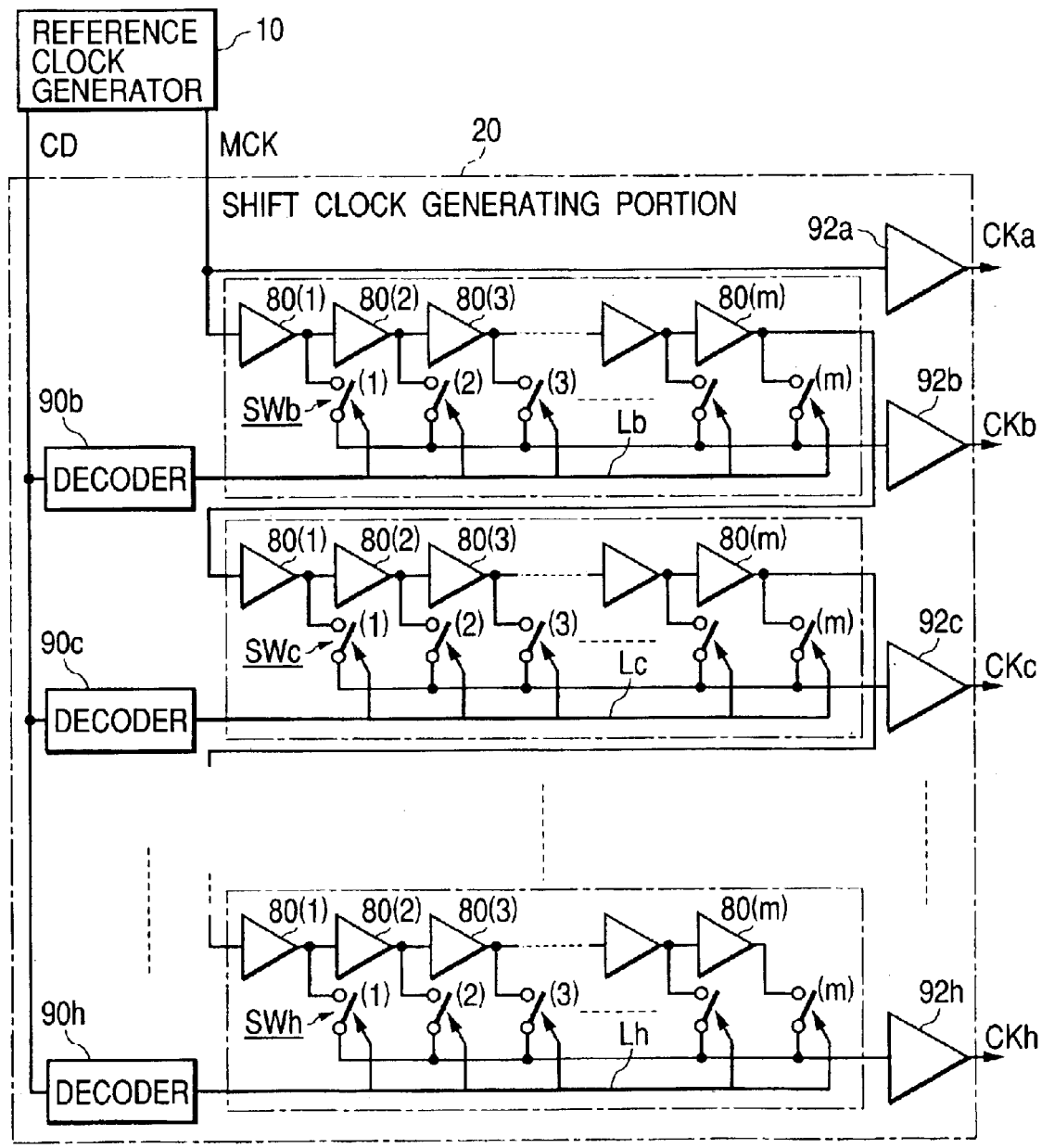
FIG. 9 is a diagram of a shift clock generating portion in a sixth embodiment of this invention.

A sixth embodiment of this invention is similar to the first embodiment thereof except that the shift clock generating portion is modified as follows. FIG. 9 shows the shift clock generating portion 20 in the sixth embodiment of this invention. The shift clock signal generating portion 20 in FIG. 9 includes delay units connected in cascade or series to compose a delay line. First one of the delay units receives the reference clock signal MCK. The reference clock signal MCK propagates through the delay units while being successively delayed thereby. The delay units are separated into seven groups assigned to the clock signals CKb, CKc, . . . , and CKh respectively. Each of the seven groups has a given number of successive delay units 80(1), 80(2), . . . , and 80(m). Regarding the clock signal CKb, the switches SWb(1), SWb(2), . . . , and SWb(m) are connected to the output terminals of the corresponding delay units 80(1), 80(2), . . . , and 80(m), respectively. Regarding the clock signal CKc, the switches SWc(1), SWc(2), . . . , and SWc(m) are connected to the output terminals of the corresponding delay units 80(1), 80(2), . . . , and 80(m), respectively. Similarly, regarding the clock signals CKd, . . . , and CKh, the switches SWd(1), SWd(2), . . . , and SWd(m), . . . , and SWh(1), SWh(2), . . . , and SWh(m) are connected to the output terminals of the corresponding delay units 80(1), 80(2), . . . , and 80(m).

Seventh Embodiment

Figure 10:
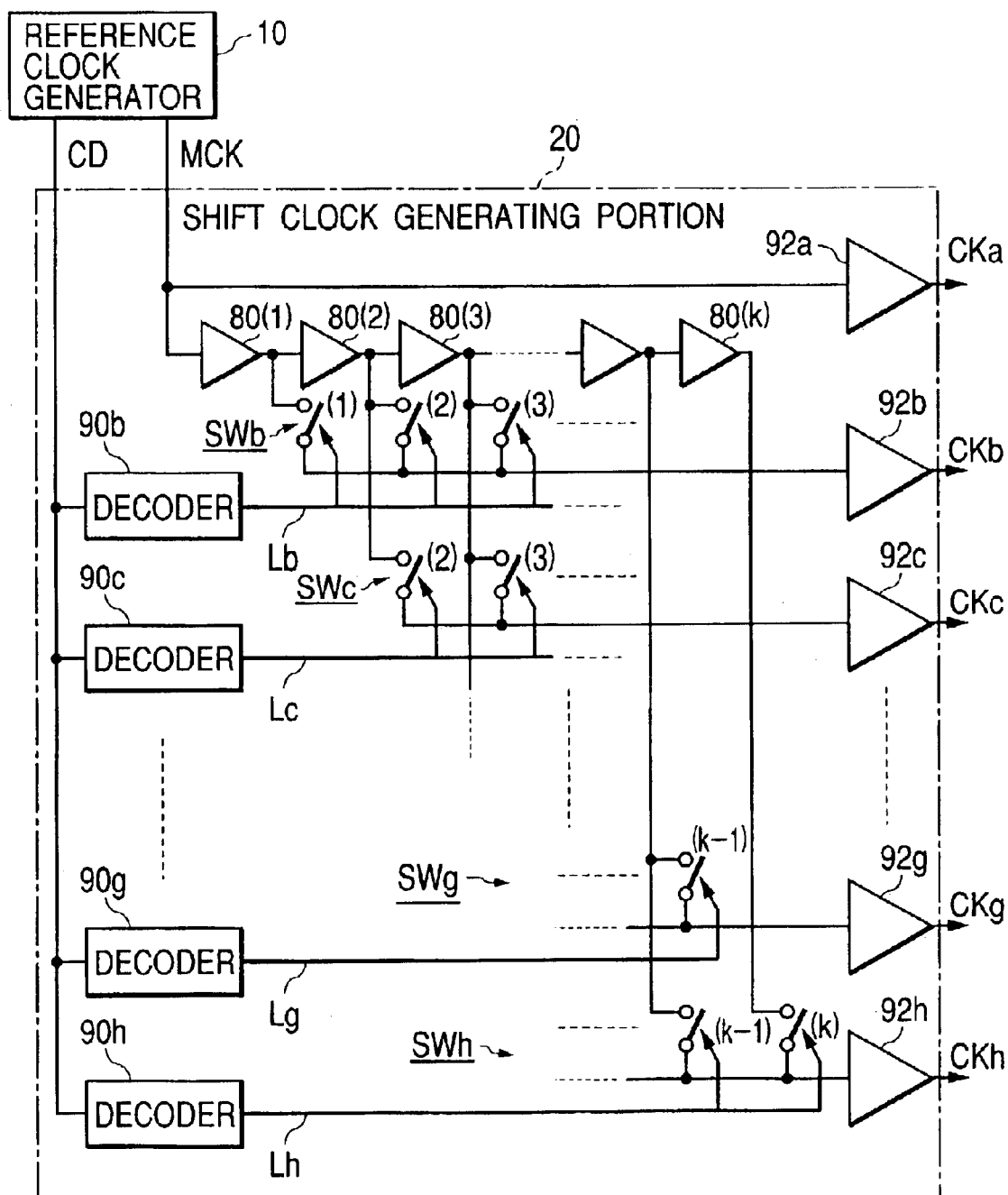
FIG. 10 is a diagram of a shift clock generating portion in a seventh embodiment of this invention.

A seventh embodiment of this invention is similar to the first embodiment thereof except that the shift clock generating portion is modified as follows. FIG. 10 shows the shift clock generating portion 20 in the seventh embodiment of this invention. One or more of the switches SWb(1), SWb(2), . . . , and SWb(k) are omitted from the shift clock signal generating portion 20 in FIG. 10. Similarly, ones or more of the switches SWc(1), SWc(2), . . . , and SWc(k), . . . , and SWh(1), SWh(2), . . . , and SWh(k) are omitted.

Specifically, regarding the clock signal CKb, later ones of the switches SWb(1), SWb(2), . . . , and SWb(k) are omitted. Regarding the clock signal CKh, former ones of the switches SWh(1), SWh(2), . . . , and SWh(k) are omitted. Regarding the other clock signals, intermediate ones of the switches are omitted.

Eighth Embodiment

An eighth embodiment of this invention is similar to the sixth embodiment thereof except that the shift clock; generating portion is modified as follows. In the eighth embodiment of this invention, one or more of the switches SWb(1), SWb(2), . . . , and SWb(m) are omitted from the shift clock signal generating portion 20 (see FIG. 9). Similarly, ones or more of the switches SWc(1), SWc(2), . . . , and SWc(m), . . . , and SWh(1), SWh(2), . . . , and SWh(m) are omitted.

Ninth Embodiment

Figure 11:
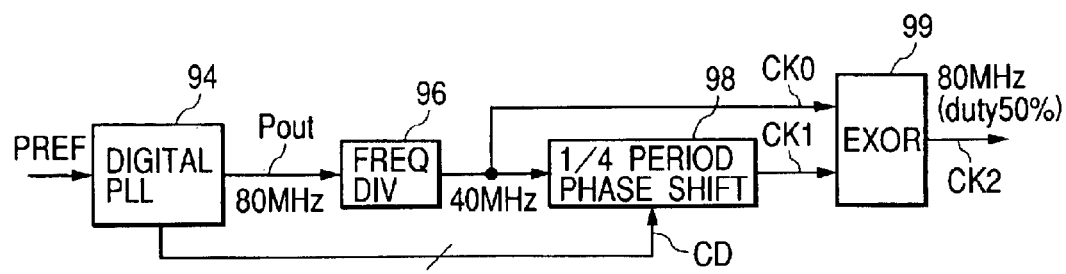
FIG. 11 is a block diagram of a clock signal generating apparatus according to a ninth embodiment of this invention.

FIG. 11 shows a clock signal generating apparatus according to a ninth embodiment of this invention. The apparatus of FIG. 11 includes a digital PLL 94, a frequency divider circuit 96, a phase shifter circuit 98, and an Exclusive-OR circuit 99.

Figure 12:
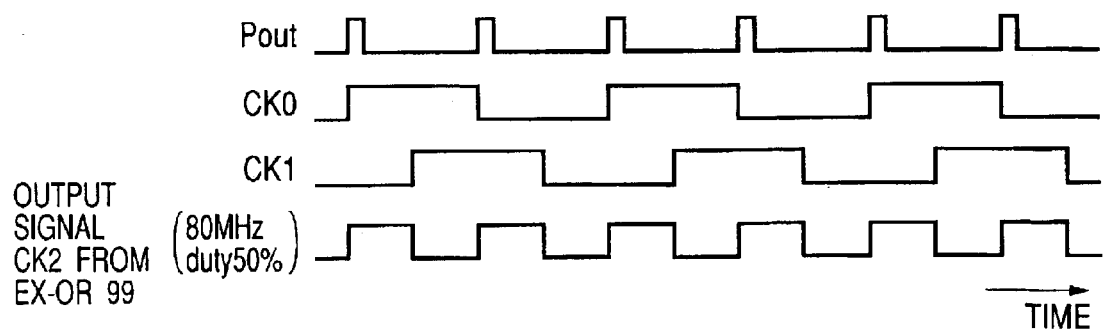
FIG. 12 is a time-domain diagram of signals occurring in the apparatus of FIG. 11.

The digital PLL 94 receives a low-frequency clock signal (a basic clock signal) PREF having a fixed frequency. The digital PLL 94 multiplies the frequency of the low-frequency clock signal PREF by a prescribed number, thereby generating a high-frequency clock signal Pout having a frequency of, for example, 80 MHz. The digital PLL 94 is similar in structure to the reference clock signal generator 10 in FIG. 7. As shown in FIG. 12, the duty cycle of the high-frequency clock signal Pout is smaller than 50%. The digital PLL 94 outputs the high-frequency clock signal Pout to the frequency divider circuit 96.

The frequency divider circuit 96 halves the frequency of the high-frequency clock signal Pout, thereby generating an intermediate-frequency clock signal CK0 having a frequency of, for example, 40 MHz. As shown in FIG. 12, the logical state of the intermediate-frequency clock signal CK0 inverts at the timing of every rising edge in the high-frequency clock signal Pout. The intermediate-frequency clock signal CK0 has a duty cycle of 50%. The frequency divider circuit 96 outputs the intermediate-frequency clock signal CK0 to the phase shifter circuit 98 and the Exclusive-OR circuit 99.

The digital PLL 94 produces control data used for the generation of the high-frequency clock signal Pout. The control data except its lowest bit are outputted from the digital PLL 94 as period data CD. The period data CD are fed from the digital PLL 94 to the phase shifter circuit 98.

The phase shifter circuit 98 shifts the phase of the intermediate-frequency clock signal CK0 by one fourth of the period thereof in response to the period data CD, thereby generating another intermediate-frequency clock signal CK1. The phase shifter circuit 98 outputs the intermediate-frequency clock signal CK1 to the Exclusive-OR circuit 99. The phase shifter circuit 98 is similar in structure to the combination of the delay units 80(1), 80(2), . . . , and 80(k), the switches SWc(1), SWc(2), . . . , and SWc(k), the decoder 90c, and the buffer 92c in FIG. 7. The decoder 90c in the phase shifter circuit 98 receives the period data CD. Also, the decoder 90c receives delay data SDc indicating a preset delay ratio (1/4). The decoder 90c determines the position of specified one SWc(?) among the switches SWc(1), SWc(2), . . . , and SWc(k) via which the desired clock signal CK1 should be taken out. The decoder 90c applies a drive signal to the group of the switches SWc(1), SWc(2), . . . , and SWc(k) which turns on the specified switch SWb(?) and turns off the other switches. Thus, the phase shifter circuit 98 outputs the intermediate-frequency clock signal CK1 which results from shifting the phase of the intermediate-frequency clock signal CK0 by one fourth of the period thereof. As shown in FIG. 12, the intermediate-frequency clock signal CK1 has a duty cycle of 50%.

The Exclusive-OR circuit 99 executes Exclusive-OR operation between the intermediate-frequency clock signals CK0 and CK1, thereby generating a high-frequency clock signal CK2 having a phase and a frequency equal to those of the high-frequency clock signal Pout. The Exclusive-OR circuit 99 outputs the high-frequency clock signal CK2 as a reference clock signal (for example, the reference clock signal MCK). As shown in FIG. 12, the high-frequency clock signal CK2 has a duty cycle of 50%.

The apparatus of FIG. 11 can be used as a duty-cycle conversion circuit. The duty cycle of the high-frequency clock signal CK2 can be adjusted in accordance with the delay ratio indicated by the delay data SDc.

What is claimed is:

1. A time measurement apparatus comprising:

a shift clock signal generating means for generating a plurality of shift clock signals in response to a reference clock signal, the shift clock signals having a period equal to a period of the reference clock signal, the shift clock signals having phases different from each other;

signal inputting means for converting an input signal into binary signals in response to the shift clock signals generated by the shift clock signal generating means respectively, the input signal containing a pulse train of a pseudo random noise code;

correlation calculating means for calculating correlations between the pseudo random noise code and the binary signals generated by the signal inputting means;

detecting means for detecting a moment at which a peak of the correlations calculated by the correlation calculating means occurs; and measuring a time interval from a prescribed moment to a moment of occurrence of the pulse train in the input signal on the basis of the moment detected by the detecting means.

2. A time measurement apparatus as recited in claim 1, wherein a number of the shift clock signals is equal to a predetermined integer "n", and differences between the phases of the shift clock signals are equal to the reference-clock-signal period divided by the predetermined integer "n".

3. A time measurement apparatus as recited in claim 1, wherein the correlations calculated by the correlation calculating means are in pairs each having correlations related to two among the shift clock signals which have phases most different from each other, and further comprising averaging means for averaging correlations in each of the pairs into a mean correlation, the detecting means operating for detecting a moment at which a peak of the mean correlations generated by the averaging means occurs as an indication of the moment of occurrence of the pulse train in the input signal.

4. A time measurement apparatus as recited in claim 1, wherein the correlation calculating means includes synchronizing means for sampling the binary signals generated by the signal inputting means into second binary signals in response to the reference clock signal, and means for calculating correlations between the pseudo random noise code and the second binary signals, the correlation calculating means and the detecting means operating in response to the reference clock signal.

5. A time measurement apparatus as recited in claim 4, wherein the detecting means operates for detecting a moment at which a peak of the correlations calculated by the correlation calculating means occurs on the basis of one of (1) a moment at which one of the correlations exceeds a preset threshold value and (2) a phase difference between the reference clock signal and one among the shift clock signals which corresponds to the correlation exceeding the preset threshold value.

6. A time measurement apparatus as recited in claim 5, wherein the detecting means operates for detecting a moment at which a peak of the correlations calculated by the correlation calculating means occurs on the basis of a moment at which one of the correlations first exceeds a preset threshold value.

7. A spread-spectrum distance measurement apparatus comprising:

pulse train generating means for generating a pulse train of a pseudo random noise code in synchronism with a reference clock signal, the pseudo random noise code having a prescribed bit length;

transmitting means for transmitting an electromagnetic wave modulated in accordance with the pulse train generated by the pulse train generating means;

receiving means for receiving an echo wave caused by reflection of the electromagnetic wave transmitted by the transmitting means at an object to be measured, and for converting the received echo wave into a received pulse train signal;

time measuring means for measuring a time interval from a moment of transmission of the electromagnetic wave from the transmitting means to a moment of reception of the echo wave by the receiving means on the basis of the pseudo random noise code and the received pulse train signal; and distance calculating means for calculating a distance to the object on the basis of the time interval measured by the time measuring means;

wherein the time measuring means comprises the time measurement apparatus of claim 1.

8. A spread-spectrum distance measurement apparatus as recited in claim 7, wherein the pulse train generating means operates for generating the pulse train of the pseudo random noise code a plurality of times, and the time measuring means operates for measuring the time interval a plurality of times, and the distance calculating means operates for averaging the time intervals measured by the time measuring means into a mean time interval, and for calculating the distance to the object on the basis of the mean time interval.

9. A spread-spectrum distance measurement apparatus as recited in claim 8, wherein the time measuring means operates for determining a center among the time intervals measured by the time measuring means, for excluding one or more among the time intervals which deviate from the center by greater than a prescribed value to get remaining time intervals, and for averaging the remaining time intervals into the mean time interval.

* * * * *